(12) United States Patent
Ellison

(10) Patent No.: US 7,935,649 B2
(45) Date of Patent: *May 3, 2011

(54) ALKALI-FREE GLASSES CONTAINING IRON AND TIN AS FINING AGENTS

(75) Inventor: Adam James Gillmar Ellison, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/756,542

(22) Filed: Apr. 8, 2010

(65) Prior Publication Data

US 2010/0197477 A1 Aug. 5, 2010

Related U.S. Application Data

(60) Continuation of application No. 12/315,204, filed on Dec. 1, 2008, now Pat. No. 7,696,113, which is a division of application No. 11/598,378, filed on Nov. 13, 2006, now Pat. No. 7,534,734.

(51) Int. Cl.
*C03C 3/087* (2006.01)
*C03C 3/091* (2006.01)

(52) U.S. Cl. .......................... 501/66; 501/70

(58) Field of Classification Search ............ 501/66, 501/70
See application file for complete search history.

(56) References Cited

U.S. PATENT DOCUMENTS

| | | | | |
|---|---|---|---|---|
| 3,338,696 | A | 8/1967 | Dockerty | 65/145 |
| 3,682,609 | A | 8/1972 | Dockerty | 65/83 |
| 4,298,389 | A | 11/1981 | Johnson et al. | 501/77 |
| 5,374,595 | A | 12/1994 | Dumbaugh, Jr. et al. | 501/66 |
| 5,785,726 | A | 7/1998 | Dorfeld et al. | 65/134.1 |
| 5,824,127 | A | 10/1998 | Bange et al. | 65/90 |
| 5,908,703 | A | 6/1999 | Brix et al. | 428/426 |
| 6,128,924 | A | 10/2000 | Bange et al. | 65/90 |
| 6,169,047 | B1 | 1/2001 | Nishizawa et al. | 501/66 |
| 6,319,867 | B1 | 11/2001 | Chacon et al. | 501/66 |
| 6,933,253 | B2 | 8/2005 | Naka et al. | 501/67 |
| 7,670,975 | B2 * | 3/2010 | Suzuki et al. | 501/66 |
| 2004/0127342 | A1 | 7/2004 | Liang et al. | 501/66 |
| 2005/0096209 | A1 | 5/2005 | Kase et al. | 501/56 |
| 2006/0003884 | A1 | 1/2006 | Nishizawa et al. | 501/72 |
| 2006/0242996 | A1 | 11/2006 | DeAngelis et al. | 65/134.1 |
| 2006/0293162 | A1 | 12/2006 | Ellison | 501/66 |
| 2008/0076656 | A1 | 3/2008 | Suzuki et al. | 501/53 |

FOREIGN PATENT DOCUMENTS

| | | |
|---|---|---|
| DE | 19939789 | 2/2001 |
| JP | 07-202208 | 12/1993 |
| JP | 2001 261366 | 3/2000 |
| JP | 2004 189535 | 11/2002 |
| JP | 2004299947 | 10/2004 |
| JP | 2006306690 | 11/2006 |
| RU | 64225 | 9/1976 |
| WO | WO2004087597 | 10/2004 |
| WO | WO2007/002865 | 1/2007 |

OTHER PUBLICATIONS

K.L. Geisinger, G.V. Gibbs, and A. Navrotsky, "A molecular orbital study of bond length and angle variations in framework silicates," *Phys Chem Minerals*, 11: 266-285 (1985).
E.M. Levin, C.R. Robbins, and H.F. McMurdie, *Phase Diagrams for Ceramists*, The American Ceramic Society, Inc., Columbus, OH (1964), pp. 219 and 246.
P. McMillan, B. Piriou, A. Navrotsky, and A. Raman, "Spectroscopic study of glasses along the joins silicacalcium aluminate, silica-sodium aluminate, and silica-potassium aluminate," *Geochim Cosmochim Acta*, 46:2021-2037 (1982).
A. Navrotsky, G. Peraudeau, P. McMillan, and J.P. Coutures, "A thermochemical study of glasses and crystals along the joins silica-calcium aluminate and silica-sodium aluminate," *Geochim Cosmochim Acta*, 46:2039-2047 (1982).
A. Navrotsky, K.L. Geisinger, P. McMillan, and G.V. Gibbs, "The tetrahedral framework in glasses and melts-inferences from molecular orbital calculations and physical properties,"*Phys Chem Minerals*, 11:284-298 (1985).
S. Scholes, *Modern Glass Practice*, Seventh Revised Edition revised by Charles H. Greene, RAN Publishers 1975, pp. 306-311 and 461.
A. Singh and S.P. Singh, "Role of tin as a reducing agent in ron containing heat absorbing soda-magnesia-lime-silica glass," *Bull. Mater. Sci.*, 27:537-541 (2004).
M. Taylor, and G.E. Brown, "Structure of mineral glasses: I. The feldspar glasses $NaAlSi_3O_8$, $KAlSi_3O_8$, $CaAl_2Si_2O_8$," *Geochim. Cosmochim Acta*, 43:61-75 (1979).

* cited by examiner

*Primary Examiner* — Karl E Group
(74) *Attorney, Agent, or Firm* — Thomas R. Beall; Maurice M. Klee

(57) ABSTRACT

Alkali-free glasses are disclosed which can be used to produce substrates for flat panel display devices, e.g., active matrix liquid crystal displays (AMLCDs). The glasses contain iron and tin as fining agents, and preferably are substantially free of arsenic and antimony. In certain embodiments, the glasses are also substantially free of barium. Methods for producing alkali-free glass sheets using a downdraw process (e.g., a fusion process) are also disclosed.

8 Claims, 8 Drawing Sheets

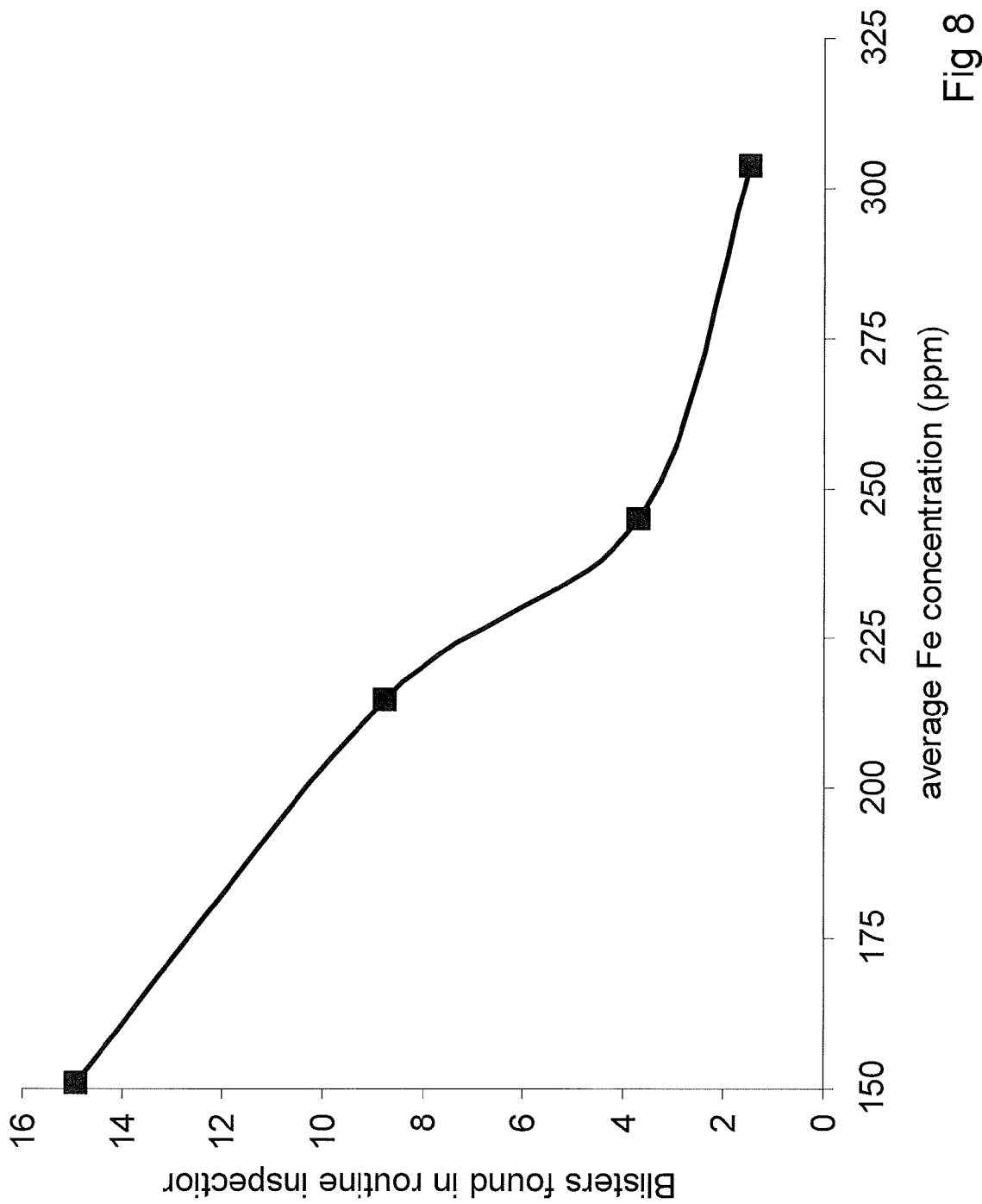

ALKALI-FREE GLASSES CONTAINING IRON AND TIN AS FINING AGENTS

CROSS-REFERENCE TO RELATED APPLICATIONS

This application is a continuation of and claims the benefit of priority to U.S. patent application Ser. No. 12/315,204, filed on Dec. 1, 2008, now U.S. Pat. No. 7,696,113, granted Apr. 13, 2010, which is a divisional of U.S. patent application Ser. No. 11/598,378, filed on Nov. 13, 2006, now U.S. Pat. No. 7,534,734, granted May 19, 2009, the content of which is relied upon and incorporated herein by reference in its entirety.

FIELD OF THE INVENTION

The present invention relates to alkali-free, boroalumino silicate glasses exhibiting desirable physical and chemical properties for use as substrates in flat panel display devices, such as, active matrix liquid crystal displays (AMLCDs). In accordance with certain of its aspects, the invention relates to the fining of such glasses (also referred to in the art as "refining")

BACKGROUND OF THE INVENTION

A. Display Technology

Displays may be broadly classified into one of two types: emissive (e.g., CRTs and plasma display panels (PDPs)) or non-emissive. This latter family, to which liquid crystal displays (LCDs) belong, relies upon an external light source, with the display only serving as a light modulator. In the case of liquid crystal displays, this external light source may be either ambient light (used in reflective displays) or a dedicated light source (such as found in direct view displays).

Liquid crystal displays rely upon three inherent features of liquid crystal (LC) materials to modulate light. The first is the ability of LC materials to cause optical rotation of polarized light. Second is the dependence of such rotation on the mechanical orientation of the liquid crystal. And third is the ability of the liquid crystal to undergo mechanical orientation by the application of an external electric field. In the construction of a simple, twisted nematic (TN) liquid crystal display, two substrates surround a layer of liquid crystal material. In a display type known as Normally White, the application of alignment layers on the inner surfaces of the substrates creates a 90° spiral of the liquid crystal director. This means that the polarization of linearly polarized light entering one face of the liquid crystal cell will be rotated 90° by the liquid crystal material. Polarization films, oriented 90° to each other, are placed on the outer surfaces of the substrates.

Light, upon entering the first polarization film becomes linearly polarized. Traversing the liquid crystal cell, the polarization of this light is rotated 90° and is allowed to exit through the second polarization film. Application of an electric field across the liquid crystal layer aligns the liquid crystal directors with the field, interrupting its ability to rotate light. Linearly polarized light passing through this cell does not have its polarization rotated and hence is blocked by the second polarization film. Thus, in the simplest sense, the liquid crystal material becomes a light valve, whose ability to allow or block light transmission is controlled by the application of an electric field.

The above description pertains to the operation of a single pixel in a liquid crystal display. High information type displays require the assembly of several million of these pixels, which are referred to in the art as sub pixels, into a matrix format. Addressing all of these sub pixels, i.e., applying an electric field to all of these sub pixels, while maximizing addressing speed and minimizing cross-talk presents several challenges. One of the preferred ways to address sub pixels is by controlling the electric field with a thin film transistor located at each sub pixel, which forms the basis of active matrix liquid crystal display devices (AMLCDs).

The manufacturing of these displays is extremely complex, and the properties of the substrate glass are extremely important. First and foremost, the glass substrates used in the production of AMLCD devices need to have their physical dimensions tightly controlled. The downdraw sheet drawing processes and, in particular, the fusion process described in U.S. Pat. No. 3,338,696 (Dockerty) and U.S. Pat. No. 3,682,609 (Dockerty), is one of the few processes capable of delivering glass sheets which can be used as substrates without requiring costly post forming finishing operations, such as lapping and polishing. Unfortunately, the fusion process places rather severe restrictions on the glass properties, requiring relatively high liquidus viscosities, preferably greater than 100,000 poises, more preferably, greater than 150,000 poises.

Typically, the two plates (substrate assemblies) that comprise a flat panel display are manufactured separately. One, the color filter plate, has a series of red, blue, green, and black organic dyes deposited on it. Each of these primary colors must correspond precisely with a sub pixel of the companion active plate. To remove the influence of differences between the ambient thermal conditions encountered during the manufacture of the two plates, it is desirable to use glass substrates whose dimensions are independent of thermal condition (i.e., glasses with lower coefficients of thermal expansion). However, this property needs to be balanced by the generation of stresses between deposited films (e.g., silicon films) and the substrates that arise due to expansion mismatch. It is estimated that an optimal coefficient of thermal expansion (CTE) is in the range of $28\text{-}35 \times 10^{-7}/°$ C. (0-300° C.), preferably, $28\text{-}34 \times 10^{-7}/°$ C. (0-300° C.), more preferably, $28\text{-}33 \times 10^{-7}/°$ C. (0-300° C.).

The active plate, so called because it contains the active, thin film transistors, is manufactured using typical semiconductor type processes. These include sputtering, CVD, photolithography, and etching. It is highly desirable that the glass be unchanged during these processes. Thus, the glass needs to demonstrate both thermal stability and chemical durability.

Thermal stability (also known as thermal compaction or shrinkage) is dependent upon both the inherent viscous nature of a particular glass composition (as indicated by its strain point) and the thermal history of the glass sheet as determined by the manufacturing process. U.S. Pat. No. 5,374,595 (Dumbaugh et al.) and U.S. Pat. No. 6,319,867 (Chacon et al.) disclose glasses with strain points in excess of 650° C. which, when subjected to the thermal history of the fusion process, have acceptable thermal stability for active plates based both on a-Si thin film transistors (TFTs) and super low temperature p-Si TFTs. Higher temperature processing (such as required by low temperature p-Si TFTs) may require the addition of an annealing step to the glass substrate to ensure thermal stability.

Chemical durability implies a resistance to attack by the various etchant solutions used in the manufacture processes. Of particular interest is a resistance to attack from the dry etching conditions used to etch the silicon layer. To benchmark the dry etch conditions, a substrate sample is exposed to an etchant solution known as 110BHF. This test consists of immersing a sample of glass in a solution of 1 volume of 50 wt. % HF and 10 volumes 40 wt. % $NH_4F$ at 30° C. for 5 minutes. The sample is graded on weight loss and appearance. In addition to the 110BHF test, glass substrates are also tested for their resistance to acid conditions. In this case, the etchant solution is 5% HCl and the glass sample is immersed in the test solution for 24 hours at 95° C.

In addition to these requirements, AMLCD manufacturers are finding that both demand for larger display sizes and the economics of scale are driving them to process larger sized pieces of glass. Current industry standards are Gen VI (1500 mm×1850 mm) and Gen VII (1870 mm×2200 mm), but future efforts are geared toward even larger sizes in excess of 2 meters on each side. This raises several concerns.

First is simply the weight of the glass. The increase in glass weight in going from one generation to the next has significant implications for the robotic handlers used to ferry the glass into and through process stations. In addition, elastic sag, which is dependent upon glass density and Young's modulus, becomes a particularly critical issue with larger sheet sizes, impacting the ability to load, retrieve, and space the glass in the cassettes used to transport the glass between process stations.

In addition to the weight and sag problems, the increasing sizes of substrates leads to greater challenges in terms of manufacturing defect-free glass sheets. Because of the small sizes of sub pixels, substrates used for display applications must be essentially completely defect free.

One of the primary sources of defects is gaseous inclusions (also known as "seeds") resulting from entrapment of air in the molten glass as batch materials are melted. Historically, such gaseous inclusions have been removed through the use of arsenic as a fining agent. However, arsenic raises environmental and health issues, and thus there has been a continuing effort in the art to produce glasses with lower arsenic levels and, preferably, glasses which are substantially arsenic free. U.S. Pat. No. 5,785,726 (Dorfeld et al.) U.S. Pat. No. 6,128,924 (Bange et al.) U.S. Pat. No. 5,824,127 (Bange et al.) and U.S. Patent Publication No. 2006/0242996 (DeAngelis et al.) disclose processes for manufacturing arsenic free glasses.

Efforts have been made to replace arsenic fining with antimony fining. However, antimony has its own environmental and health issues. Also, compared to arsenic, antimony is a less effective fining agent.

In quantitative terms, the gaseous inclusion level in commercially produced glass sheets needs to be less than or equal to 0.10 gaseous inclusions/$cm^3$ of glass and preferably less than or equal to 0.05 inclusions/$cm^3$ for sheets having a volume of at least 500 $cm^3$. Moreover, it is not sufficient to achieve a low level of gaseous inclusions in one or just a few glass sheets, but in order to be cost effective, glass manufacturers need to achieve the above low inclusion levels consistently. A measure of such consistency is to examine the gaseous defect level in a population of sequentially produced glass sheets, e.g., 50 sequential glass sheets. Thus, to have commercial viability, a glass intended for use as a substrate in display applications needs to achieve the above (or better) gaseous inclusion levels on average for at least 50 sequential sheets.

In view of the foregoing, it would be desirable to provide a glass composition for display devices having a low density to alleviate difficulties associated with larger sheet size, preferably less than or equal to 2.45 grams/$cm^3$ and a liquidus viscosity greater than or equal to 100,000 poises to allow manufacture by, for example, the fusion process. In addition, it would be desirable for the glass to have a thermal expansion coefficient (CTE) in the range of $28-35\times10^{-7}$/° C., preferably in the range of $28-34\times10^{-7}$/° C., and more preferably between about $28-33\times10^{-7}$/° C., over the temperature range of 0-300° C. Furthermore, it would be advantageous for the glass to have a strain point greater than 650° C., and for the glass to be resistant to attack from etchant solutions. It would also be desirable for the glass to have a low gaseous inclusion level when commercially manufactured without the use of arsenic and/or antimony as fining agents.

B. Iron and Tin in Glasses for Use as LCD Substrates

The iron and tin content of glasses to be used as LCD substrates has been discussed in a number of references.

US Patent Publication No. 2005/0096209 is directed to the use of ammonium salts as fining agents for LCD glasses. The amount of ammonium ($NH_4^+$) in the glass is from 0.0001 to 0.01 wt. %, preferably from 0.0004 to 0.001 wt. %. For such ammonium salts to be effective, the glass needs to have what this reference refers to as a high "reduction degree." The reduction degree, in turn, can be determined by measuring the ratio of $Fe^{2+}$ to the sum of $Fe^{2+}$ plus $Fe^{3+}$. To measure this ratio, the reference states that the content of Fe calculated as $Fe_2O_3$ needs to be at least 0.0015 wt. % (15 ppm). On the upper end, the content of Fe calculated as $Fe_2O_3$ is at most 0.3 wt. % (3,000 ppm) and in the case of glasses used for display applications is at most 0.2 wt. % (2,000 ppm), preferably at most 0.1 wt. % (1,000 ppm), and more preferably at most 0.05 wt. % (500 ppm). In terms of tin, the reference states that its glasses do not contain $SnO_2$ or, if they do, its content is at most 0.03 parts per 100 parts (300 ppm) by mass of the glass, preferably at most 0.02 parts per 100 parts (200 ppm). None of the examples of this reference include tin.

Japanese Patent Publication No. 07-202208 relates to reducing the absorption of LCD substrates at 300 nanometers by keeping the concentration of $Fe^{+3}$ less than or equal to 0.005 wt. % (50 ppm). The reference does not disclose a specific glass composition and does not mention $SnO_2$.

Japanese Patent Publication No. 2001-261366 is also concerned with the transmission of light at 300 nanometers, as well as at longer wavelengths. It discloses an $Fe^{+3}$ content of 0.008-0.050 wt. % (80-500 ppm) when expressed in terms of $Fe_2O_3$, with the total iron oxide content being 0.009-0.055 wt. % (90-550 ppm) when expressed in terms of $Fe_2O_3$. Some examples use tin at the 0.5 wt. % (5,000 ppm) or 1.0 wt. % (10,000 ppm) level. All of the examples include arsenic and/or antimony.

Japanese Patent Publication No. 2004-189535 is a further reference concerned with the transmission of iron-containing LCD substrates. It limits the Fe content to 0.005-0.03 wt. % (50-300 ppm) (preferably 0.007-0.03 wt. %; 70-300 ppm) in terms of $Fe_2O_3$ and adds $SnO_2$ to the glass (0.01-0.3 wt. %; 100-3,000 ppm) to convert $Fe^{3+}$ to $Fe^{2+}$. According to the reference, arsenic inhibits the effects of tin and thus its concentration is no more than 0.1 wt. %, preferably no more than 0.05 wt. %. To achieve fining with low levels of arsenic, the reference uses antimony and chlorine, the amount of antimony being no more than 1.0 wt. % because, like arsenic, antimony has an absorption peak in the UV range. All of the examples use at least one of arsenic, antimony, and chlorine. Those that have just chlorine have an $Fe_2O_3$ content of 200 ppm or less.

Some references have disclosed glasses that do not contain arsenic, antimony, or barium. US Patent Publication No. 2005/0096209, discussed above, includes examples of this type, as does U.S. Pat. No. 6,169,047. This later patent states that ZnO, $SO_3$, F, Cl and $SnO_2$ may be incorporated in a total amount of at most 5 mol %. The patent does not mention iron, and none of its examples have tin or iron. U.S. Pat. No. 5,908,703 contains one example that does not contain arsenic, antimony, or barium (Example 3). That example contains 1.0 wt. % $SnO_2$ (10,000 ppm). The patent does not mention iron.

SUMMARY OF THE INVENTION

In accordance with a first aspect, the invention provides a glass that is substantially free of alkalis comprising in mole percent on an oxide basis:
$SiO_2$: 64.0-71.0
$Al_2O_3$: 9.0-12.0
$B_2O_3$: 7.0-12.0
MgO: 1.0-3.0
CaO: 6.0-11.5
SrO: 0-2.3 (preferably 0-1.0)
BaO: 0-2.3 (preferably 0-0.1)
$As_2O_3$: 0-0.05 (preferably 0-0.02)
$Sb_2O_3$: 0-0.05 (preferably 0-0.02)
wherein:
(a) the glass has an iron content expressed as $Fe_2O_3$ in the range of 0.010-0.033 mole percent; and
(b) the glass has a tin content expressed as $SnO_2$ in the range of 0.017-0.112 mole percent.

In accordance with a second aspect, the invention provides a glass that is substantially free of alkalis, barium, arsenic, and antimony and comprises:
(a) $SiO_2$, $Al_2O_3$, $B_2O_3$ MgO, CaO and SrO;
(b) iron expressed as $Fe_2O_3$ in the range of 0.010-0.033 mole percent; and
(c) tin expressed as $SnO_2$ in the range of 0.017-0.112 mole percent.

In accordance with a third aspect, the invention provides a method for producing glass sheets that are substantially alkali free by a downdraw process (e.g., a fusion process) comprising selecting, melting, and fining batch materials so that the glass making up the sheets comprises $SiO_2$, $Al_2O_3$, $B_2O_3$, MgO, CaO, and SrO, and has:
(i) an iron content expressed as $Fe_2O_3$ in the range of 0.010-0.033 mole percent; and
(ii) a tin content expressed as $SnO_2$ in the range of 0.017-0.112 mole percent;
wherein:
(a) the fining is performed without the use of substantial amounts of either arsenic or antimony; and
(b) a population of 50 sequential glass sheets produced by the downdraw process from the melted and fined batch materials has an average gaseous inclusion level of less than 0.05 gaseous inclusions/cubic centimeter, where each sheet in the population has a volume of at least 500 cubic centimeters.

In accordance with a fourth aspect, the invention provides a method for producing glass sheets that are substantially alkali free by a downdraw process (e.g., a fusion process) comprising:
(a) selecting batch materials so that the glass making up the sheets comprises $SiO_2$, $Al_2O_3$, $B_2O_3$, MgO, CaO, and SrO;
(b) melting and fining the batch materials selected in step (a);
(c) producing glass sheets using the melted and fined batch materials of step (b) (preferably, without the use of substantial amounts of either arsenic or antimony);
(d) measuring the iron content expressed as $Fe_2O_3$ of the glass making up the glass sheets of step (c); and
(e) if the iron content measured in step (d) is outside the range of 0.010-0.033 mole percent, repeating steps (a) through (d) until the iron content measured in step (d) is in the range of 0.010-0.033 mole percent.

Preferably, after step (e), a population of 50 sequential glass sheets produced by the downdraw process from the melted and fined batch materials has an average gaseous inclusion level of less than 0.05 gaseous inclusions/cubic centimeter, where each sheet in the population has a volume of at least 500 cubic centimeters.

In certain preferred embodiments of this aspect of the invention, in step (d), the tin content expressed as $SnO_2$ of the glass making up the glass sheets is also measured and if outside the range of 0.017-0.112 mole percent, steps (a) through (d) are repeated until the tin content measured in step (d) is in the range of 0.017-0.112 mole percent.

In accordance with each of the foregoing aspects of the invention, the glass preferably has some and most preferably all of the following properties:
(a) an iron content expressed as $Fe_2O_3$ in the range of 0.012-0.024 mole percent;
(b) a tin content expressed as $SnO_2$ in the range of 0.021-0.107 mole percent;
(c) a BaO content that is less than or equal to 0.05 mole percent (i.e., the glasses are substantially free of BaO);
(d) a sulfur content expressed as elemental sulfur that is less than or equal to 0.002 mole percent (approximately 10 ppm for the glasses of the invention);
(e) a halide content that is less than or equal to 0.4 mole percent (which for chlorine corresponds to approximately 2200 ppm for the glasses of the invention); and/or
(f) an $Fe^{2+}$ to $Fe^{3+}$ ratio that is greater than or equal to 0.5.

In accordance with each of the foregoing aspects of the invention, the glass also preferably has some and most preferably all of the following properties:
(a) a density that is less than or equal to 2.41 grams/cm$^3$;
(b) a liquidus viscosity that is greater than or equal to 100,000 poise;
(c) a strain point that is greater than or equal to 650° C.; and/or
(d) a linear coefficient of thermal expansion (CTE) over the temperature range 0-300 ° C. which satisfies the relationship:

$$28 \times 10^{-7}/°C. \leq CTE \leq 35 \times 10^{-7}/°C.$$

In accordance with each of the foregoing aspects of the invention, the glass also preferably satisfies one and most preferably both of the following relationships:
(a) $\Sigma[RO]/[Al_2O_3] \geq 1.00$ (preferably, $\Sigma[RO]/[Al_2O_3] \geq 1.03$), and/or
(b) $\Sigma[RO]/[Al_2O_3] \leq 1.25$ (preferably, $\Sigma[RO]/[Al_2O_3] \leq 1.12$),
where $[Al_2O_3]$ is the mole percent of $Al_2O_3$ and $\Sigma[RO]$ equals the sum of the mole percents of MgO, CaO, SrO, and BaO.

For the glasses of the invention, $Fe_2O_3$ in the range of 0.010-0.033 mole percent corresponds to approximately 250-800 ppm in weight percent, while 0.012-0.024 mole percent corresponds to approximately 300-600 ppm. In the case of tin, for the glasses of the invention, $SnO_2$ in the range of 0.017-0.112 mole percent corresponds to approximately 400-2600 ppm in weight percent, while the range of 0.021-0.107 mole percent corresponds to approximately 500-2500 ppm.

It should be noted that the ranges specified above include the end points of the range. For example, when $SiO_2$ is specified to have a concentration of 64.0-71.0 mole percent on an oxide basis, the 64.0 and 71.0 values are included in the permissible values for the $SiO_2$ concentration. Similarly, when a concentration or other parameter is described as "being between X and Y," the X and Y values are included as part of the range.

Additional features and advantages of the invention are set forth in the detailed description which follows and, in part, will be readily apparent to those skilled in the art from that description or recognized by practicing the invention as described herein. The accompanying drawings are included to provide a further understanding of the invention, and are incorporated in and constitutes a part of this specification.

It is to be understood that the various features of the invention disclosed in this specification and in the drawings can be used in any and all combinations. More generally, both the above summary and the following detailed description are merely exemplary of the invention and are intended to provide an overview or framework for understanding the nature and character of the invention.

BRIEF DESCRIPTION OF THE DRAWINGS

FIG. 8 shows the effect of iron on blisters per pound values found during routine inspection of glass sheets produced by a fusion process.

DETAILED DESCRIPTION OF THE INVENTION

A. Base Glass

Figure 1:
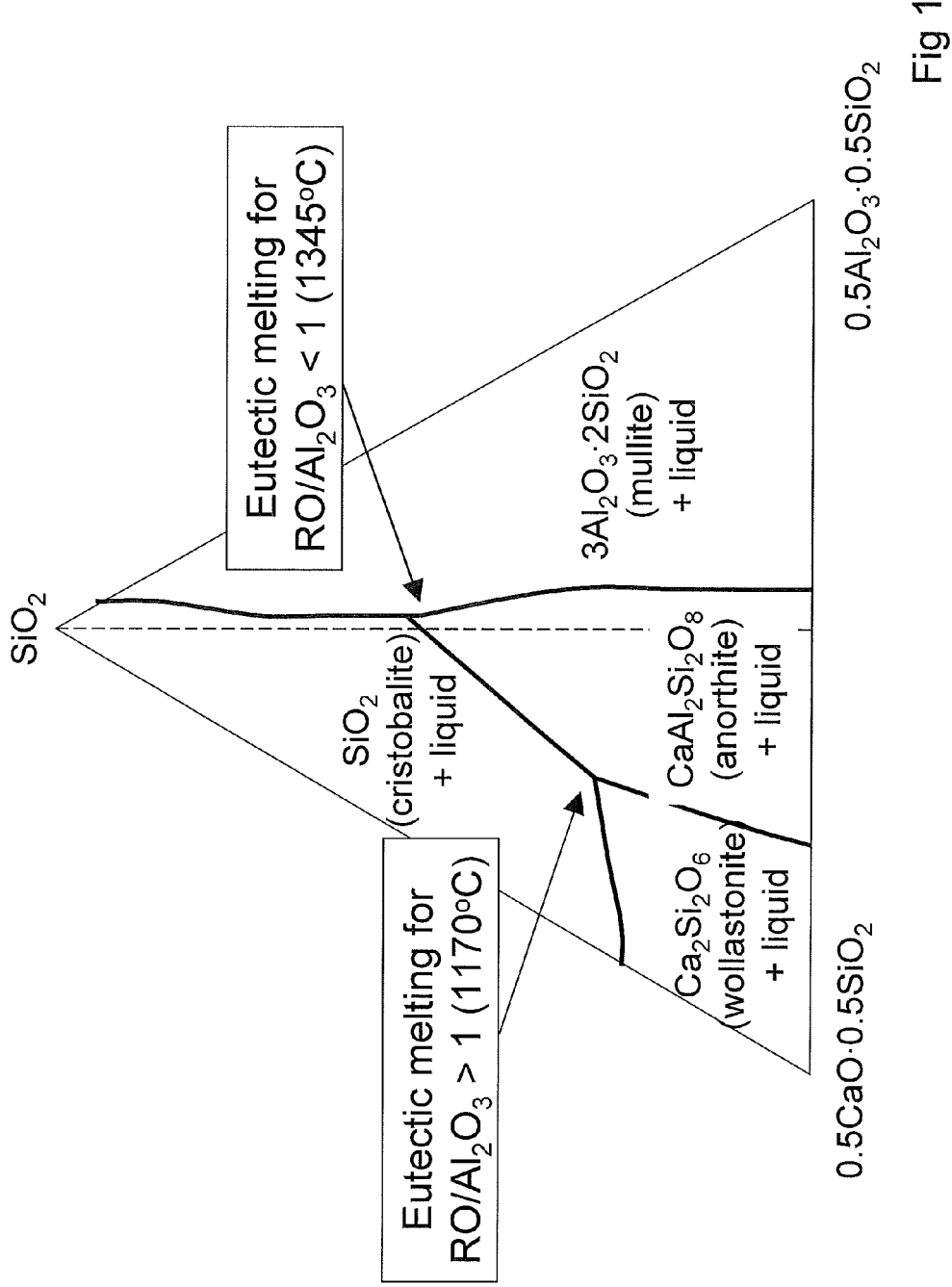
FIG. 1 is a liquidus phase diagram of the $CaO$—$Al_2O_3$—$SiO_2$ system.

As discussed above, the present invention is concerned with improved glasses for use as substrates in flat panel displays, e.g., AMLCDs. In particular, the glasses meet the various property requirements of such substrates. The major components of the glass are $SiO_2$, $Al_2O_3$, $B_2O_3$, and at least two alkaline earth oxides, i.e., at least MgO and CaO.

$SiO_2$ serves as the basic glass former of the glasses of the invention. Its concentration should be greater than 64 mole percent in order to provide the glass with a density and chemical durability suitable for a flat panel display glass, e.g., an AMLCD glass, and a liquidus temperature (liquidus viscosity) which allows the glass to be formed by a downdraw process (e.g., a fusion process).

In particular, to be suitable for use in flat panel display applications, in particular, AMLCDs, the glasses of the invention preferably have a density less than or equal to 2.45 grams/cm³ (more preferably, less than or equal to 2.43 grams/cm³, most preferably, less than or equal to 2.41 grams/cm³), a weight loss which is less than or equal to 0.8 milligrams/cm² when a polished sample is exposed to a 5% HCl solution for 24 hours at 95° C., and a weight loss of less than 1.5 milligrams/cm² when exposed to a solution of 1 volume of 50 wt. % HF and 10 volumes 40 wt. % $NH_4F$ at 30° C. for 5 minutes.

To be formed by a downdraw process, the glasses preferably have a liquidus viscosity which is greater than or equal to 100,000 poises, more preferably greater than or equal to 150,000 poises, and most preferably greater than or equal to 200,000 poises.

In terms of an upper limit, the $SiO_2$ concentration should be less than or equal to 71 mole percent to allow batch materials to be melted using conventional, high volume, melting techniques, e.g., Joule melting in a refractory melter. When the concentration of $SiO_2$ goes above 71 mole percent, the 200 poise temperature (melting temperature) generally rises above 1650° C., which is typically the upper limit for conventional melting processes.

Preferably, the $SiO_2$ concentration is between 66.0 and 70.5 mole percent, more preferably between 66.5 and 70.0 mole percent, and most preferably, between 67.0 and 69.5 mole percent. As a result of their $SiO_2$ content, the glasses of the invention typically have melting temperatures greater than or equal to 1600° C. and less than or equal to 1650° C.

As known in the art, $SiO_2$ is typically added as a crushed sand made of alpha quartz, either from loose sand deposits or mined from sandstone or quartzite. While these are commercially available at low cost, other crystalline or amorphous forms of $SiO_2$ can be substituted in part or in whole with little impact on melting behavior. Because molten $SiO_2$ is very viscous and dissolves slowly into alkali-free glass, it is generally advantageous that the sand be crushed so that at least 85% of it passes through a U.S. mesh size of 100, corresponding to mesh opening sizes of about 150 microns. In production, fines may be lofted by batch transfer processes or by air-handling equipment, and to avoid the health hazards this presents it may be desirable to remove the smallest fraction of crushed sand as well.

$Al_2O_3$ is another glass former of the glasses of the invention. An $Al_2O_3$ concentration greater than or equal to 9.0 mole percent provides the glass with a low liquidus temperature and a corresponding high liquidus viscosity. The use of at least 9.0 mole percent $Al_2O_3$ also improves the glass' strain point and modulus. In order to achieve an $\Sigma[RO]/[Al_2O_3]$ ratio greater than or equal to 1.00 (see below), the $Al_2O_3$ concentration needs to be kept below or at most equal to 12.0 mole percent. Preferably, the $Al_2O_3$ concentration is between 9.5 and 11.5 mole percent.

$B_2O_3$ is both a glass former and a flux that aids melting and lowers the melting temperature. To achieve these effects, the glasses of the invention have $B_2O_3$ concentrations that are equal to or greater than 7.0 mole percent. Large amounts of $B_2O_3$, however, lead to reductions in strain point (approximately 10° C. for each mole percent increase in $B_2O_3$ above 7.0 mole percent), modulus, and chemical durability.

For use in flat panel (e.g., AMLCD) applications, the glasses of the invention preferably have a strain point equal to or greater than 650° C. (more preferably, equal to or greater than 655° C., most preferably, equal to or greater than 660° C.), a Young's modulus equal to or greater than $10.0 \times 10^6$ psi (more preferably, equal to or greater than $10.3 \times 10^6$ psi; most preferably, equal to or greater than $10.6 \times 10^6$ psi), and a chemical durability as described above in connection with the discussion of the $SiO_2$ content of the glass. A high strain point is desirable to help prevent panel distortion due to compaction/shrinkage during thermal processing subsequent to manufacturing of the glass. A high Young's modulus is desirable since it reduces the amount of sag exhibited by large glass sheets during shipping and handling.

To achieve the above properties, the glasses of the invention have $B_2O_3$ concentrations that are less than or equal to 12.0 mole percent. Preferably, the $B_2O_3$ concentration is between 8.0 and 12.0 mole percent, more preferably between 8.5 and 11.5 mole percent, and most preferably, between 9.0 and 11.0 mole percent.

The $Al_2O_3$ and $B_2O_3$ concentrations are preferably selected as a pair to increase strain point, increase modulus, improve durability, reduce density, and reduce CTE, while maintaining the melting and foaming properties of the glass. For example, an increase in $B_2O_3$ and a corresponding decrease in $Al_2O_3$ can be helpful in obtaining a lower density and CTE, while an increase in $Al_2O_3$ and a corresponding decrease in $B_2O_3$ can be helpful in increasing strain point, modulus, and durability, provided that the increase in $Al_2O_3$ does not reduce the $\Sigma[RO]/[Al_2O_3]$ ratio below 1.00. For reference, as discussed above, glasses for use in AMLCD applications preferably have CTE's (0-300° C.) in the range of $28\text{-}35\times10^{-7}/°$C.

In addition to the glass formers ($SiO_2$, $Al_2O_3$, and $B_2O_3$), the glasses of the invention also include at least two alkaline earth oxides, i.e., at least MgO and CaO, and, optionally, SrO and/or BaO. As known in the art, the alkaline earths are typically added as oxides (especially MgO), carbonates (CaO, SrO and BaO), nitrates (CaO, SrO and BaO), and/or hydroxides (all). In the case of MgO and CaO, naturally-occuring minerals that can serve as sources include dolomite ($Ca_xMg_{1-x})CO_3$), magnesite ($MgCO_3$), brucite ($Mg(OH)_2$), talc ($Mg_3Si_4O_{10}(OH)_2$), olivine ($Mg_2SiO_4$) and limestone ($CaCO_3$). These natural sources include iron, and so can be used as a means to add this component as well.

The alkaline earth oxides provide the glass with various properties important to melting, fining, forming, and ultimate use. For example, the MgO concentration in the glass and the glass' $\Sigma[RO]/[Al_2O_3]$ ratio, where $[Al_2O_3]$ is the mole percent of $Al_2O_3$ and $\Sigma[RO]$ equals the sum of the mole percents of MgO, CaO, SrO, and BaO, are critical to the glass' performance and, in particular, are critical with regard to meltability and fining.

Although not wishing to be bound by any particular theory of operation, it is believed that following aspects of glass chemistry are involved in the roles of MgO and the $\Sigma[RO]/[Al_2O_3]$ ratio in the glasses of the invention.

As is known in the art, in aluminosilicate glasses, $Al^{3+}$ ions seek to be surrounded by four oxygen ions ($O^{2-}$). One means by which this occurs is traditionally called a charge-balance interaction. A silicon ion ($Si^{4+}$) bonded to four $O^{2-}$ can be thought of as contributing $\frac{1}{4}\times(+4)$ or an incremental charge of +1 towards the bonding requirements of each $O^{2-}$. If one of these oxygen ions is bonded in turn to a 4-fold coordinated $Al^{3+}$, then there is an additional contribution of $\frac{1}{4}\times(+3)=+\frac{3}{4}$ towards the bonding requirements of the $O^{2-}$ ion, for a total of $+1\frac{3}{4}$. The remaining $+\frac{1}{4}$ can be obtained by a nearby +2 cation such as an alkaline earth, e.g., $\frac{1}{8}\times(+2)=+\frac{1}{4}$. The total charge contributed by positively charged ions exactly balances the negative charge of the oxygen ions, and aluminum can remain in 4-fold coordination. The +2 cations that serve in this role are referred to as charge-balancing cations. Provided that the $\Sigma[RO]/[Al_2O_3]$ ratio is 1 or more, it then follows that nearly all aluminum in calcium aluminosilicate glasses is 4-fold coordinated by oxygen. See M Taylor, G E Brown, Structure of mineral glasses: I. The feldspar glasses $NaAlSi_3O_8$, $KAlSi_3O_8$, $CaAl_2Si_2O_8$. *Geochim. Cosmochim Acta* 43:61-75 (1979); P. McMillan, B. Piriou, A Navrotsky, A Raman spectroscopic study of glasses along the joins silica-calcium aluminate, silica-sodium aluminate, and silica-potassium aluminate. *Geochim Cosmochim Acta* 46:2021-2037 (1982); and A Navrotsky, G Peraudeau, P McMillan, J P Coutures, A thermochemical study of glasses and crystals along the joins silica-calcium aluminate and silica-sodium aluminate. *Geochim Cosmochim Acta* 46:2039-2047 (1982). As is also known in the art, the efficacy of charge-balance by +2 cations varies inversely with their size. The usual explanation for this is that small +2 cations polarize oxygen ions and destabilize their bonds with other cations. See K L Geisinger, G V Gibbs, A Navrotsky, A molecular orbital study of bond length and angle variations in framework silicates. *Phys Chem Minerals* 11: 266-285 (1985); and A Navrotsky, K L Geisinger, P McMillan, G V Gibbs, The tetrahedral framework in glasses and melts-inferences from molecular orbital calculations and physical properties. *Phys Chem Minerals* 11:284-298 (1985). The preferred +2 cations in the glasses of the invention are CaO, MgO, SrO, and BaO in order of maximum concentration. The $Ca^{2+}$ ion is better at stabilizing aluminum in 4-fold coordination than the $Mg^{2+}$ ion, but not as effective as the $Sr^{2+}$ ion. In the glasses of the present invention, $Ba^{2+}$ and $Sr^{2+}$ will be completely consumed in charge-balancing interactions, followed by $Ca^{2+}$ up to the limit that virtually all $Al^{3+}$ ions are stabilized in 4-fold coordination by $Ca^{2+}$, $Sr^{2+}$ or $Ba^{2+}$. If $Al^{3+}$ ions remain that still require charge-balance, $Mg^{2+}$ ions will be used for this purpose until the remaining $Al^{3+}$ ions are stabilized in 4-fold coordination.

The alkaline earth ions that are not used to stabilize aluminum in 4-fold coordination will tend to share oxygen ions with adjacent silicon ions. In this role, the alkaline earths are termed network modifying cations, because they break up the tetrahedral network of Si—O—Si and Si—O—Al bonds. The acceptable composition ranges for the glasses of the invention require all $Sr^{2+}$ and $Ba^{2+}$ to be consumed in charge-balancing roles so the only alkaline earth ions that can be available as network modifying cations are $Ca^{2+}$ and $Mg^{2+}$. In breaking up the network structure of the glass, the modifying cations contribute to reduced viscosity at elevated temperature, thereby facilitating the basic melting process. They also reduce the solubility of gases in the glass, thereby reducing the possibility of bubble nucleation and growth at high temperature. Further, they attack silica particles in the batch materials, causing them to be rapidly incorporated into a homogeneous melt. Finally, and most important for the glasses of the invention, they can reduce the stability of crystalline silica (e.g., cristobalite), stabilizing the liquid and thereby increasing the viscosity at which a crystal first appears on cooling. This is one of the key reasons why the $\Sigma[RO]/[Al_2O_3]$ ratio must be $\geq 1$.

To understand this last role, i.e., the role of reducing the stability of crystalline silica, it is useful to consider the liquidus phase diagram of the $CaO—Al_2O_3—SiO_2$ system as depicted in FIG. 1 (data used to prepare this figure are from E M Levin, C R Robbins, H F McMurdie, Phase Diagrams for Ceramists. The American Ceramic Society, Inc., Columbus, Ohio (1964), p. 219, converted to mole percent). The curves running through the middle of the diagram denote boundaries in composition space across which the crystal in equilibrium with a liquid changes its identity. At the top of the figure is cristobalite, a crystalline polymorph of $SiO_2$. To the lower right is mullite, approximately $3Al_2O_3.2SiO_2$, an aluminosilicate containing aluminum in 4-, 5- and 6-fold coordination. In the lower middle of the diagram is the calcium aluminosilicate anorthite, $CaAl_2Si_2O_8$, in which the $CaO/Al_2O_3$ ratio is 1.0 and all $Al^{3+}$ ions are 4-fold coordinated by oxygen. The phase in the lower left is wollastonite, $Ca_2Si_2O_6$, in which all $Si^{4+}$ ions are 4-fold coordinated by oxygen, all $Ca^{2+}$ ions are 6-fold coordinated by oxygen, and at least some of the oxygen ions are shared between $Ca^{2+}$ and $Si^{4+}$ ions. The vertical line running through the middle of the triangle denotes compositions for which the $CaO/Al_2O_3$ ratio is exactly 1.0. In each of these regions, the crystal in question is in equilibrium with a molten glass, and the region of equilibrium between liquid and a particular crystal is referred to as the liquidus phase field of the crystal.

Where two liquidus phase fields intersect, the curve indicating the intersection is called a cotectic, and where three phase fields intersect, the point at which the fields converge is referred to as a eutectic. Eutectics are locations where three crystalline phases simultaneously coexist with a liquid. They are, by definition, local minima in the melting temperatures of the particular crystalline assemblage, and therefore are the compositions for which the liquid is most stable relative to any one or combination of the three crystalline phases. Two eutectics are seen in FIG. 1. The first, between cristobalite, anorthite and mullite (right-hand side) is a single melt down to 1345° C., at which point the three crystalline phases simultaneously come into equilibrium with the liquid. The second, between wollastonite, anorthite and cristobalite, is a single melt down to 1170° C., at which point those three phases simultaneously come into equilibrium with the liquid.

Were a crystalline assemblage of wollastonite, cristobalite and anorthite heated up from room temperature, the first appearance of a liquid would be at 1170° C., and the composition of the liquid would be equivalent to that of the corresponding eutectic composition. Likewise, were a crystalline assemblage of anorthite, mullite and cristobalite heated up from room temperature, the first appearance of a liquid would be at 1345° C. and the composition of the liquid would be that of the corresponding eutectic between these phases. Between these two eutectics, temperatures increase monotonically to the line denoting $CaO/Al_2O_3=1.0$. This line denotes a thermal maximum in $RO—Al_2O_3—SiO_2$ systems, for R=Ca, Sr and Ba. In other words, $(Ca,Sr,Ba)O—Al_2O_3—SiO_2$ compositions to the $Al_2O_3$-rich side of the $(Ca,Sr,Ba)O/Al_2O_3=1$ line will melt at the [alkaline earth aluminosilicate]-mullite-cristobalite eutectic composition, and are thermodynamically hindered from melting at the [alkaline earth silicate]-[alkaline earth aluminosilicate]-cristobalite side of the phase diagram.

Figure 2:
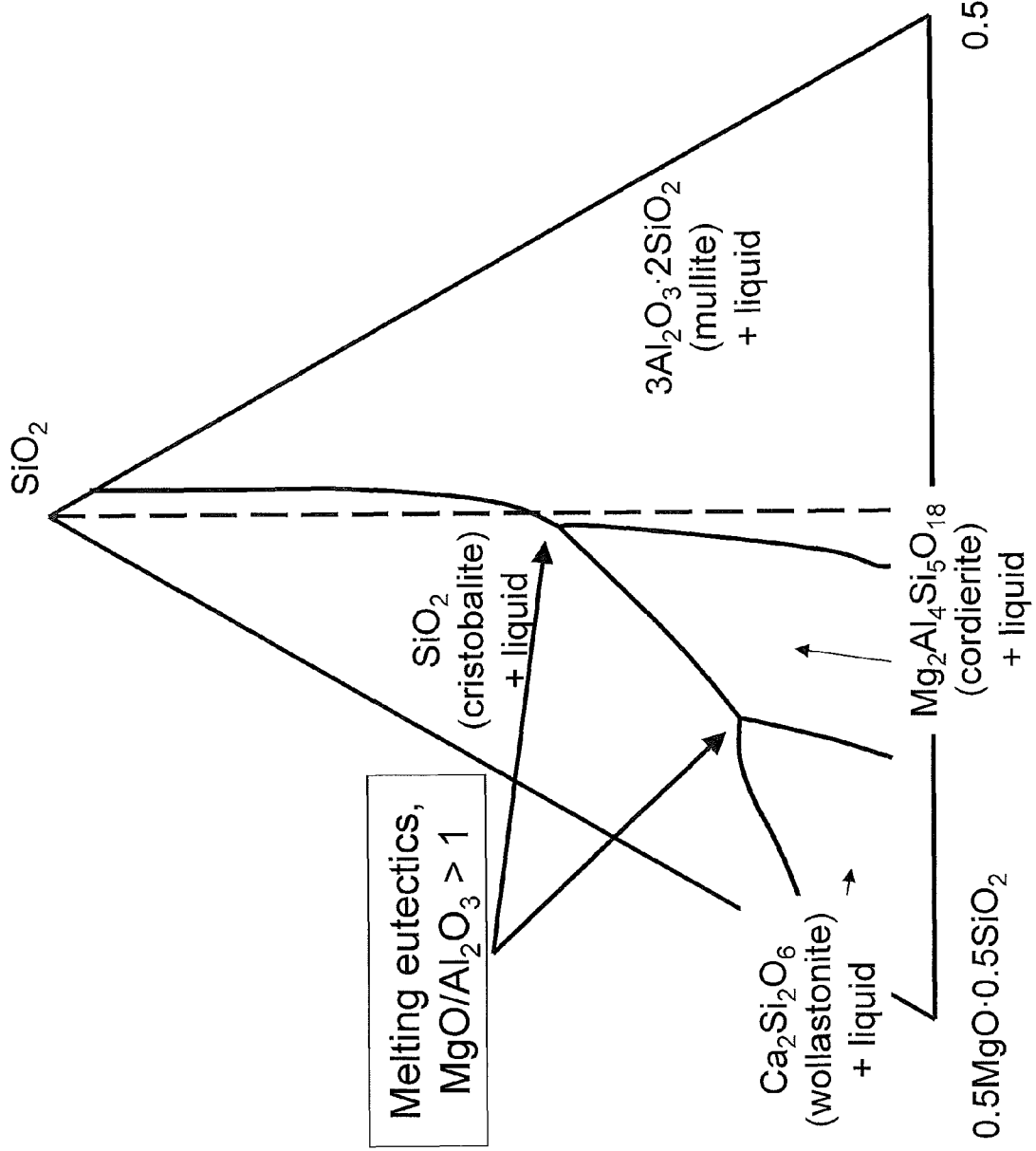
FIG. 2 is a liquidus phase diagram of the $MgO$—$Al_2O_3$—$SiO_2$ system.

FIG. 2 shows the liquidus phase diagram of the $MgO—Al_2O_3—SiO_2$ system (data used to prepare this figure are from E M Levin, C R Robbins, H F McMurdie, Phase Diagrams for Ceramists. The American Ceramic Society, Inc., Columbus, Ohio (1964), p. 246, converted to mole percent). This system is unique among $RO—Al_2O_3—SiO_2$ systems in that the magnesium aluminosilicate (cordierite)-mullite-cristobalite eutectic composition has an $\Sigma[RO]/[Al_2O_3]$ ratio slightly greater than 1. Unlike the other $RO—Al_2O_3—SiO_2$ systems, initial melting of high-silica compositions in the magnesium-based system will thus tend to occur at eutectics with $\Sigma[RO]/[Al_2O_3]>1.00$. Another point of considerable importance is that the eutectics in question are at much lower silica concentrations than any of the other $RO—Al_2O_3—SiO_2$ systems. Therefore, the lowest liquidus temperatures will be found at comparatively low silica concentrations in the $MgO—Al_2O_3—SiO_2$ system compared to the other $RO—Al_2O_3—SiO_2$ systems.

For the purposes of the glasses of the invention, the most important consequences of the compositions of early-stage melts pertain to gas solubilities and the appearance of gaseous inclusions in the glass. The solubility of gases is comparatively high in aluminum-rich glasses and falls steeply as the $\Sigma[RO]/[Al_2O_3]$ ratio increases beyond 1.00. Furthermore, silica is the last component to dissolve during melting, and as it does so the solubility of gas decreases considerably. In RO-rich systems, silica dissolution occurs at a comparatively low temperature, thus further inhibiting initial gas solubility. The net impact of this is that RO-rich glasses have low initial gas solubility, and the solubility actually increases as melting proceeds, whereas $Al_2O_3$-rich glasses have very high initial solubility, but it decreases as melting proceeds. As solubility decreases, gas is forced out of the glass and into bubbles. The surfaces of partially-reacted silica particles serve as effective nucleation sites for these bubbles, and help keep them in the body of the glass.

Another key component of the glasses of the invention is boric oxide, $B_2O_3$. It does not participate significantly in any of the binary or ternary aluminosilicate crystals nor in $SiO_2$, and as a consequence its main impact is to decrease liquidus temperature through simple dilution. The main result is that for a given point on the liquidus surface of, for example, the $CaO—Al_2O_3—SiO_2$ system, the liquidus temperatures will decrease with addition of $B_2O_3$. It is found empirically in high silica liquids that the impact of $B_2O_3$ on liquidus temperatures is about twenty (20) degrees Centigrade per mol %. As an example, the temperature of the anorthite-cristobalite-mullite eutectic (on the $Al_2O_3$-rich side of FIG. 1) decreases from 1345° C. to about 1145° C. when it is diluted by 10 mol % $B_2O_3$. The impact of dilution on liquidus temperatures is commonly referred to as freezing point depression.

A surprising result of composition investigations in AMLCD-type glass compositions is that the substitution of 1-3 mol % MgO for CaO in the $CaO—Al_2O_3—SiO_2$ system causes an abrupt shift in the position of the anothite-mullite-cristobalite liquidus to approximately the same position as the cordierite-mullite-cristobalite liquidus in the $MgO—Al_2O_3—SiO_2$ system. As a consequence, the addition of MgO not only forces all initial melting to the RO-rich side of the phase diagram, but also produces local minima in liquidus temperatures below those that might be expected from either the MgO- or CaO-based systems alone. The former follows from the discussion above concerning the $MgO—Al_2O_3—SiO_2$ system. The latter arises because the addition of a suitably small amount of any oxide will initially reduce liquidus temperatures via freezing point depression. Therefore, while intuitively one would anticipate an increase in liquidus temperatures because of the high temperatures in the ternary systems, i.e., systems having only MgO or CaO, one in fact obtains a decrease from about 1-3 mol %, followed by increasing liquidus temperatures thereafter. Since viscosity is not significantly impacted by the substitution of MgO for CaO, the net result of the decreasing liquidus temperature is an increase in liquidus viscosity. High liquidus viscosities are a prerequisite for precision sheet downdraw processes used to convert molten glass into sheet suitable for AMLCD applications.

Previously, it was believed that MgO concentrations equal to or greater than 1 mole percent raised liquidus temperatures (lowered liquidus viscosities), thereby compromising high viscosity forming processes, such as, downdraw processes, e.g., fusion processes. However, as discussed above and illustrated by the examples presented below, it has been found that higher levels of MgO can be used, provided that simultaneously, the $\Sigma[RO]/[Al_2O_3]$ ratio and $SiO_2$ concentration are carefully controlled as described above.

Thus, in sum, the foregoing considerations show that of the alkaline earth oxides, MgO is particularly important with regard to melting and fining. In addition, relative to the other alkaline earth oxides, the presence of MgO results in lower density and CTE, and a higher chemical durability, strain point, and modulus.

In terms of concentrations, MgO should be greater than or equal to 1.0 mole percent in order to achieve the various benefits associated with MgO described above. At concentrations greater than 3.0 mole percent, even with control of the $\Sigma[RO]/[Al_2O_3]$ ratio and the $SiO_2$ concentration, the liquidus temperature rises and liquidus viscosity falls such that forming the glass using a high viscosity forming process (e.g., a fusion process) is compromised. Preferably, the MgO concentration is between 1.2 and 2.8 mole percent, more preferably between 1.4 and 2.6 mole percent, and most preferably, between 1.6 and 2.4 mole percent.

Of the alkaline earth oxides, the CaO concentration in the glasses of the invention is the largest. CaO is essential to producing low liquidus temperatures (high liquidus viscosities), high strain points and moduli, and CTE's in the most desired ranges for flat panel applications, specifically, AMLCD applications. It also contributes favorably to chemical durability, and compared to other alkaline earth oxides it is relatively inexpensive as a batch material. Accordingly, the CaO concentration needs to be greater than or equal to 6.0 mole percent. However, at high concentrations, CaO increases density and CTE. Accordingly, the CaO concentration of the glasses of the invention is less than or equal to 11.5 mole percent. Preferably, the CaO concentration is between 6.5 and 10.5 mole percent.

The remaining alkaline earth oxides—SrO and BaO—can both contribute to low liquidus temperatures (high liquidus viscosities) and thus the glasses of the invention will typically contain at least one of these oxides. However, both oxides increase CTE and density and lower modulus and strain point compared to MgO and CaO. Between SrO and BaO, BaO generally has more adverse effects on glass properties than SrO. Also, in terms of producing an environmentally friendly "green" product, minimizing or eliminating barium is considered preferable since barium is one of the listed metals in the Resources Conservation and Recovery Act (RCRA) and is therefore classified by the US EPA as hazardous.

It is thus preferable to keep barium at as low a level as possible for the purposes of making an environmentally-friendly glass. However, the same fining characteristics will be obtained when barium oxide (BaO) is included as part of the overall RO concentration of a glass. That is, when the quantity $(MgO+CaO+SrO+BaO)/Al_2O_3 < 1$, bubbles will form at a late stage in melting and remain trapped in the glass, whereas when $(MgO+CaO+SrO+BaO)/Al_2O_3 \geq 1$, gas will be eliminated at an early stage, producing fewer inclusions. Therefore, while the preferred embodiment is substantially free of barium, the most general embodiment of the invention includes barium as well as other alkaline earth cations.

When used, barium can often help reduce liquidus temperatures, albeit generally at the expense of density and coefficient of thermal expansion. If the concentration of barium is played off against other alkaline earths in the glass, particularly strontium, it is possible to obtain properties within the relatively narrow confines of the preferred embodiment that nevertheless contain >0.1 mol % BaO. Insofar as the physical properties and desired fining behavior are concerned, low concentrations of barium (i.e., concentrations that are less than or equal to 2.3 mole percent, preferably, less than or equal to 1.5 mole percent, more preferably, less than or equal to 0.1 mole percent) do not result in an unacceptable penalty, and thus there is no necessary reason to exclude barium from the glass.

To summarize, although the BaO concentration in the glasses of the invention can be as high as 2.3 mole percent, it is preferably less than or equal to 1.5 mole percent, more preferably, less than or equal to 0.1 mole percent, and most preferably, less than 0.05 mole percent (referred to herein as being "substantially free of barium").

Strontium suffers from none of the toxic characteristics of barium and therefore AMLCD glasses containing strontium, but not barium, arsenic, or antimony, are perceived as being "super green." The SrO concentration of the glasses of the invention is less than or equal to 2.3 mole percent, preferably less than or equal to 2.0 mole percent, and most preferably, less than or equal to 1.0 mole percent. The SrO concentration will normally be greater than the BaO concentration. Typically, the sum of the SrO and BaO concentrations will be greater than or equal to 0.4 mole percent, primarily to provide a sufficiently high liquidus viscosity so that the glass can be formed by a downdraw process.

In addition to the above components, the glasses of the invention can include various other oxides to adjust various physical, melting, fining, and forming attributes of the glasses. Examples of such other oxides include, but are not limited to, $TiO_2$, MnO, ZnO, $Nb_2O_5$, $MoO_3$, $Ta_2O_5$, $WO_3$, $Y_2O_3$, $La_2O_3$, and $CeO_2$. The amount of each of these oxides should be less than or equal to 2.0 mole percent, and their total combined concentration should be less than or equal to 5.0 mole percent. The glasses of the invention will also include various contaminants associated with batch materials and/or introduced into the glass by the melting, fining, and/or forming equipment used to produce the glass (e.g., $ZrO_2$).

The glasses of the invention will also normally contain some alkali as contaminants, in particular, lithium (Li), sodium (Na), and potassium (K). However, for AMLCD applications, the alkali levels need to be kept below or at most equal to 0.1 mole percent $R_2O$ (R=Li,Na,K) to avoid having a negative impact on thin film transistor (TFT) performance through diffusion of alkali ions from the glass into the silicon of the TFT. As used herein, a "glass that is substantially free of alkalis" (also known as an "alkali-free glass") is a glass having a total alkali concentration expressed as $R_2O$ which is less than or equal to 0.1 mole percent, where the total alkali concentration is the sum of the $Na_2O$, $K_2O$, and $Li_2O$ concentrations. Preferably, the total alkali concentration is less than or equal to 0.07 mole percent.

B. Fining

As discussed above, an $\Sigma[RO]/[Al_2O_3]$ ratio greater than or equal to 1.00 has been found to improve fining, i.e., the removal of gaseous inclusions from the melted batch materials. This improvement allows for the use of more environmentally friendly fining packages. For example, on an oxide basis, the glasses of the invention, can have one or more of the following compositional characteristics and, preferably, have both of these characteristics:

(i) an $As_2O_3$ concentration of at most 0.05 mole percent (referred to herein as being substantially free of arsenic); and/or (ii) an $Sb_2O_3$ concentration of at most 0.05 mole percent (referred to herein as being substantially free of antimony).

As is well-known, $As_2O_3$ is the most effective high temperature fining agent for AMLCD glasses, and in some embodiments of the present invention, $As_2O_3$ is used for fining because of its superior fining properties. However, $As_2O_3$ is poisonous and thus requires special handling during the glass manufacturing process. Accordingly, in the preferred embodiments, fining is performed without the use of substantial amounts of $As_2O_3$, i.e., the finished glass has at most 0.05 mole percent $As_2O_3$. Most preferably, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the strain point in comparison to glasses which use $As_2O_3$ or $SnO_2$ as a fining agent.

Accordingly, in the preferred embodiments, fining is performed without the use of substantial amounts of $Sb_2O_3$, i.e., the finished glass has at most 0.05 mole percent $Sb_2O_3$. Most preferably, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

In addition to the fining considerations relating to the early stages of melting discussed above, if molten glass comes in contact with platinum or a platinum alloy at some stage in the melting apparatus, then it is possible for hydrogen to exit the glass through the platinum, leaving behind a gaseous defect. The defect can take two forms.

First, if the glass in contact with platinum has substantial dissolved sulfate, then the sulfate can reduce via hydrogen permeation to leave a defect filled with $SO_3$ (or $SO_2$) and oxygen. Denoting one or the other of these species as $SO_{2+x}$ (x=0–1), the reaction in which sulfate participates in hydrogen permeation is conveniently thought of in terms of the reduction of sulfuric acid, viz.,

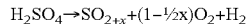

$$H_2SO_4 \rightarrow SO_{2+x} + (1-\tfrac{1}{2}x)O_2 + H_2$$

In this case, $SO_{2+x}$, is the primary reaction product, and because of its very low solubility in any glass, it exsolves into a gaseous inclusion, hence remaining as a defect through the rest of the melt process. Unless a subsequent oxidation occurs to make it soluble sulfate, or a further reduction to make it soluble $S_2^-$, the $SO_{2+x}$ remains as a permanent defect. It is therefore highly desirable to keep the sulfur level in the glass batch as low as reasonably achievable. The total sulfur content of the glass, expressed as elemental sulfur, is preferably less than or equal to 0.002 mole percent and more preferably, less than or equal to 0.001 mole percent, to keep defects at an acceptable level.

Second, in a glass that is substantially free of sulfate, the defect will consist primarily of oxygen at first. As the glass moves toward the exit of the apparatus, the oxygen will be partially or completely absorbed by multivalents in the glass, but other gases dissolved in the glass will move into the defect, particularly $N_2$ and $CO_2$. The exchange of these gases into the bubble is limited by their diffusivities in the melt at temperature, which is typically rather low. Therefore, if the glass has a low concentration of multivalents, then oxygen resorption will be slow, and the bubble will remain comparatively large, appearing as a rejectable defect in the ware. If sufficient multivalents are present, the bubble will shrink to a very small size via consumption of oxygen before there is time for substantial gas exchange, and will not appear as a defect in the final ware. Indeed, multivalents may suppress initial formation and nucleation of the defect by immediately absorbing oxygen as it is generated at the Pt/glass interface.

Historically, this oxygen resorption function has been performed by arsenic oxide or antimony oxide in typical display glasses. If these are excluded, then other multivalents need to be present at as high a level as reasonably achievable.

One such multivalent is tin. Compared to $As_2O_3$ and $Sb_2O_3$ fining, tin fining (i.e., $SnO_2$ fining) is less effective, but $SnO_2$ is a ubiquitous material which has no known hazardous properties. Also, for many years, $SnO_2$ has been a component of AMLCD glasses through the use of tin oxide electrodes in the Joule melting of the batch materials for such glasses (e.g., the melting of Corning Incorporated Code 7059, 1737, and EAGLE 2000 glasses). The presence of $SnO_2$ in AMLCD glasses has not resulted in any known adverse effects in the use of these glasses in the manufacture of liquid crystal displays. $SnO_2$, however, can form crystalline defects in AMLCD glasses when used at high concentrations. In particular, the high viscosity and thus low draw temperatures used in the fusion process limit the solubility of $Sn^{4+}$ in the molten glass. Accordingly, the concentration of $SnO_2$ in the finished glass is preferably less than or equal to 0.112 mole percent. The tin concentration of the glass can be adjusted through the batching of tin containing materials, such as, $SnO_2$, $SnO$, $SnCO_3$, $SnC_2O_4$, and the like.

In accordance with the invention, it has been discovered that in addition to tin, iron is another multivalent that is an effective fining agent especially when used in combination with tin.

Historically, iron levels in AMLCD glasses have been kept low, i.e., at tramp levels of up to approximately 100 ppm (approximately 0.004 mole percent for a typical AMLCD glass), in order to produce substrates having sufficient transparency for LCD applications. Significantly, the glasses for which this has been done have included arsenic, antimony and/or halides. Although not wishing to be bound by any particular theory of operation, it is believed that iron preferentially complexes with antimony and/or arsenic in the glass, allowing for charge-transfer interactions that move the absorption edge into the visible. This is plainly observed in simple arsenic- or antimony-doped glasses, where ppm levels of iron are sufficient to produce strong yellow coloration. Likewise, though the concentration of both may be very low, it is well known to those skilled in the art that halide-doped glasses frequently have substantial color due to complexes formed between transition metals and halides. Since iron is a frequent tramp component and has a relatively high concentration for such a component, it is usually the largest contributor to such complexes, and thus largely responsible for the strong yellow color that results from these interactions. Even when various of these components are absent, it has been believed that low iron is advantageous in achieving suitable near UV transparency for LCD applications, particularly those in which the TFT photolithography occurs through the substrate itself (see Section II(B) above).

Figure 3:
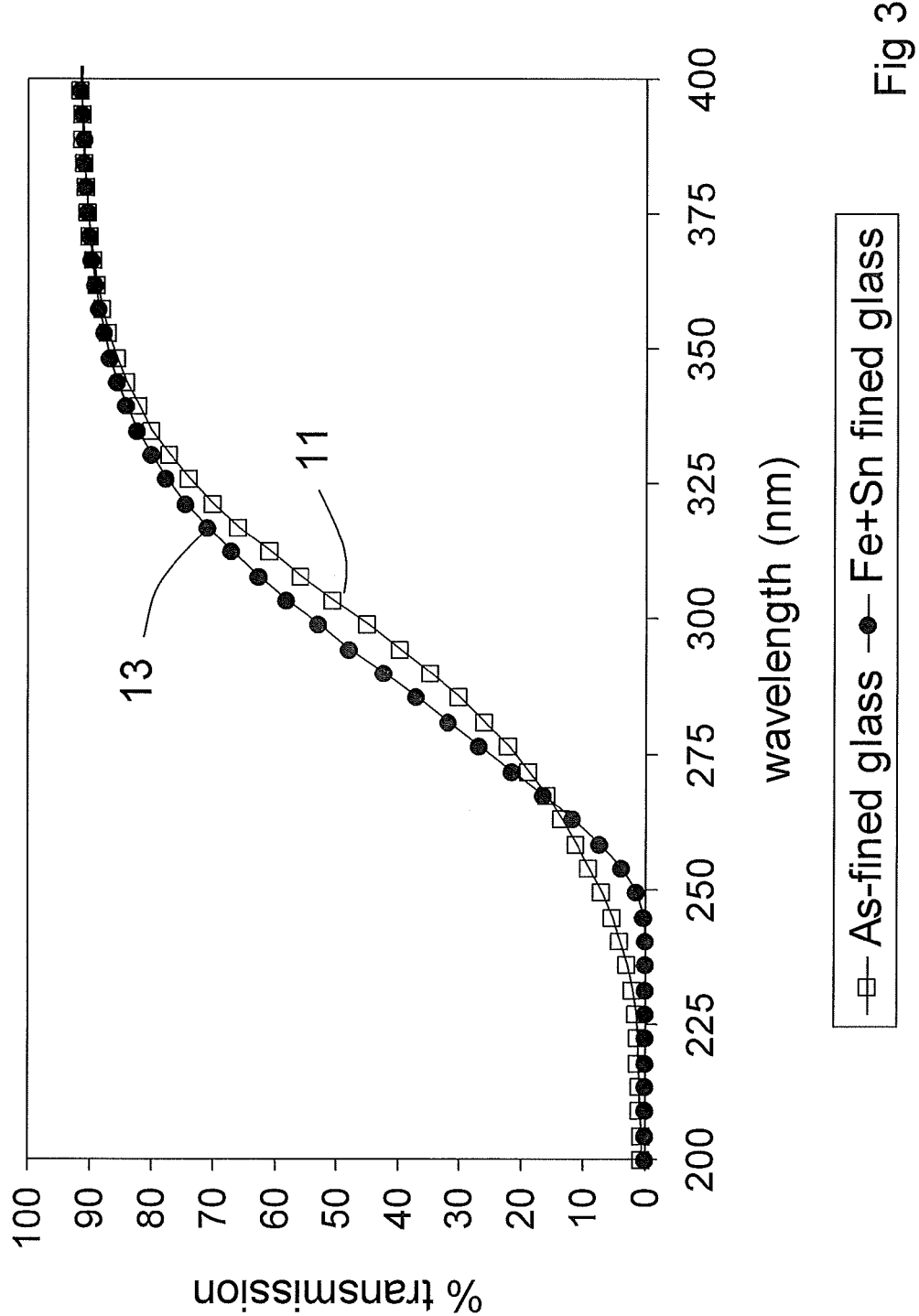
FIG. 3 is a plot of percent transmission versus wavelength in nanometers for: (i) Corning Incorporated's Code Eagle2000® LCD glass which was fined with arsenic (curve 11); and (ii) a glass constructed in accordance with commonly assigned U.S. application Ser. No. 11/478,493 which was fined with tin (curve 13).

Surprisingly and in direct contrast to these prior beliefs, in accordance with the invention, it has been found that iron levels do not have to be kept low to achieve suitable transmission levels provided that the glass is substantially free of arsenic, antimony, and halides. This discovery is illustrated in FIG. 3, which is a plot of percent transmission versus wavelength in nanometers for: (i) Corning Incorporated's Code Eagle2000® LCD glass which was fined with arsenic (curve 11); and (ii) a glass constructed in accordance with commonly assigned U.S. application Ser. No. 11/478,493 which was fined with tin (curve 13). (The contents of U.S. application Ser. No. 11/478,493 in their entirety are hereby incorporated herein by reference.) Both glasses contained similar amounts of tramp iron. As shown in FIG. 3, by removing arsenic, the transmission improved. In particular, it improved at both 300 nm and 350 nm, which are commonly-used benchmark wavelengths for the UV transmission of LCD substrates.

It should be noted that in the presence of tin, specifically, $Sn^{2+}$, iron shifts to $Fe^{3+}$ which has a strong UV absorption. Accordingly, just as there is an upper limit on tin (i.e., 0.112 mole percent) based on the formation of crystalline defects (see above), there is an upper limit on iron (i.e., 0.033 mole percent) for applications in which UV photolithography is to be performed through an LCD substrate, but based on transmission, as opposed to defect formation. Looked at another way, in accordance with certain preferred embodiments of the invention, the iron and tin levels of the glass are selected so that at least 50 percent of the iron is in its +2 state, preferably, at least 60 percent, and most preferably, at least 70 percent. The percent of total iron in the +2 state is determined by electron paramagnetic resonance (EPR) or by colorimetric titration.

Also, to avoid the formation of complexes with halides, the halide content of the glass, i.e., the sum of the mole percents of elemental Br, Cl, and F, is preferably less than or equal to 0.4 mole percent, more preferably, less than or equal to 0.2 mole percent, and most preferably, less than or equal to 0.1 mole percent.

The iron content of the glass can be adjusted by batching iron in the form of its oxides (FeO, $Fe_3O_4$, or $Fe_2O_3$), organometallic compounds (e.g., iron oxalate, $FeC_2O_4$), halides ($FeCl_2.6H_2O$ or $FeCl_3.6H_2O$), and/or by using (selecting) batch materials for other oxides that contain suitable amounts of iron. For example, sand and limestone, typical sources of $SiO_2$ and CaO, respectively, can have varying amounts of iron contaminants, and talc, a common source for MgO in some industrial applications, also contains significant amounts of iron. Indeed, in accordance with the invention, it was found that the use of purer sources of sand and/or limestone (i.e., sand or limestone with less impurities) can result in more gaseous inclusions than achieved with less pure sources since the less pure sources typically have more iron than the purer sources. This was particularly surprising with the purer versus less pure sources of sand since the less pure source had a higher water content which in itself leads to more, rather than less, gaseous inclusions in the absence of the iron effect.

When batch materials are selected or iron is added so as to increase the total iron concentration above a contamination level, one immediately obtains several benefits. First, to the extent that the iron in the batch materials is present as $Fe_2O_3$, its reduction to FeO during the early stages of melting can contribute oxygen to early-stage bubbles, helping them to rise out of the glass via buoyancy forces.

Second, trivalent iron helps to absorb infrared radiation, particularly at a blackbody temperature of 1600° C., a typical melting temperature for glasses of the preferred embodiments of this invention. This improves melting efficiency and enhances process stability.

Figure 4:
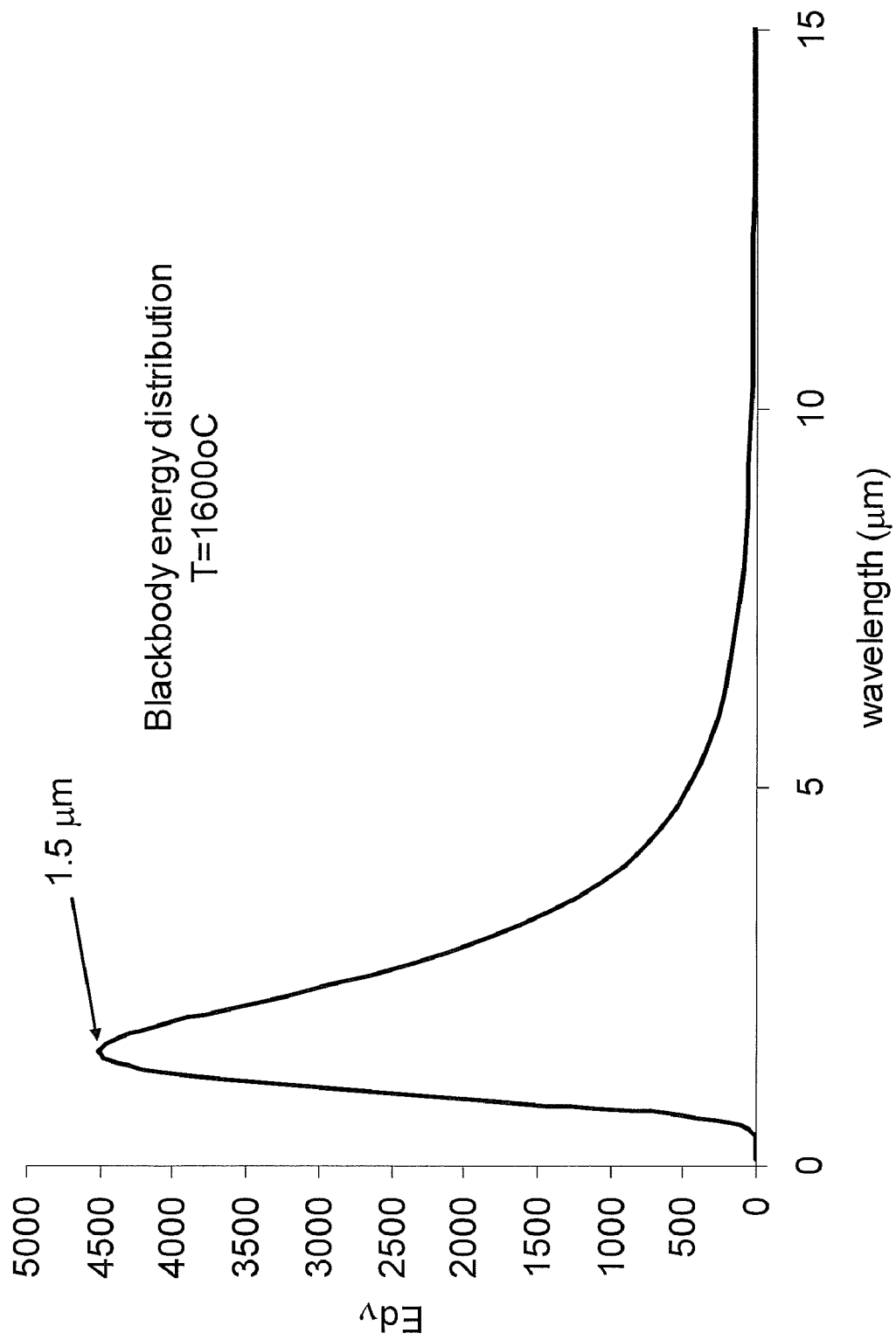
FIG. 4 is a plot of calculated energy versus wavelength for a blackbody at 1600° C.
Figure 5:
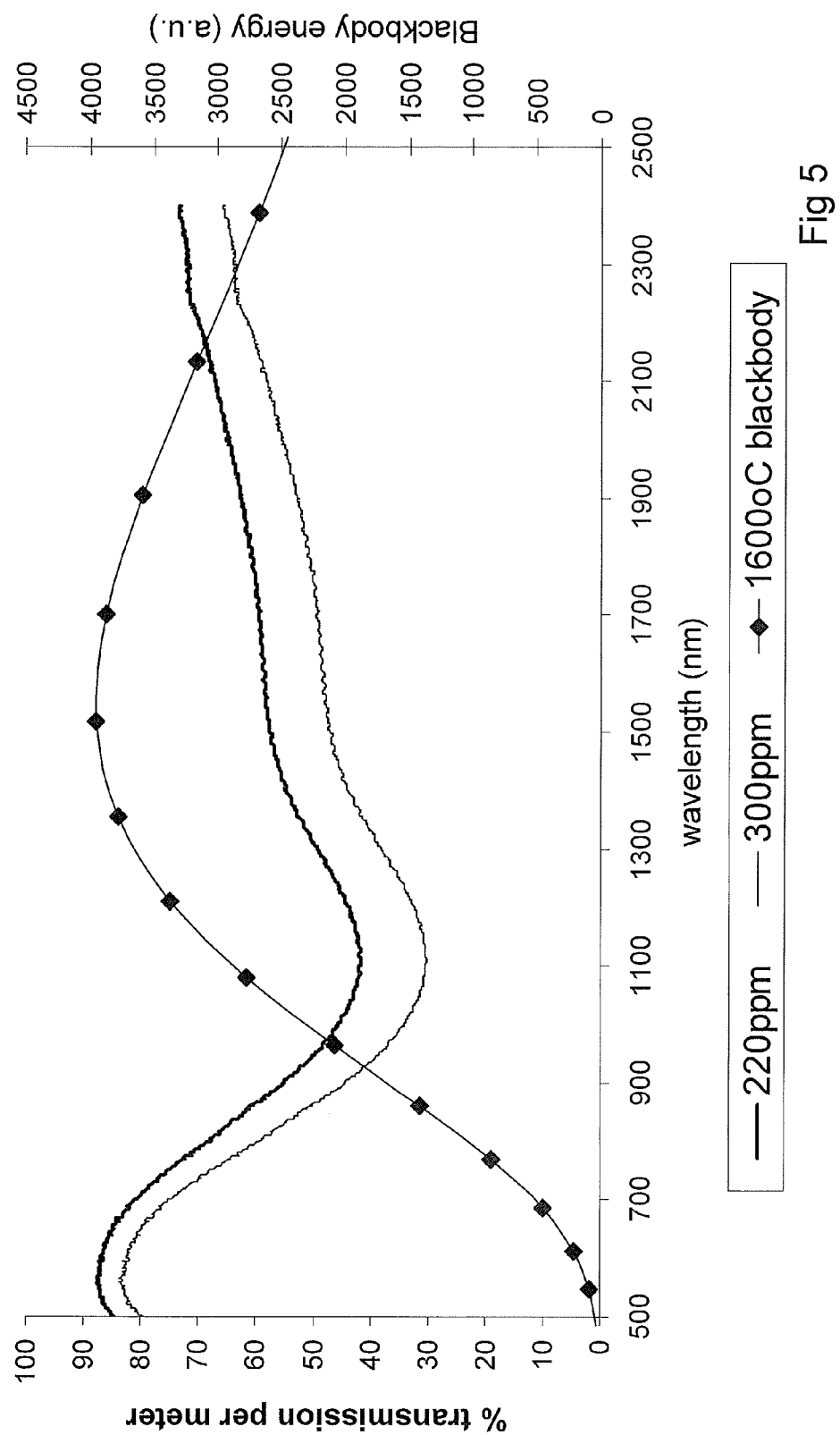
FIG. 5 is an expanded portion of FIG. 4 for the wavelength range of 500 to 2500 nm (see right hand vertical axis and curve 15) along with transmission curves for 220 ppm and 300 ppm iron in an aluminosilicate glass (see left hand vertical axis and curves 17 and 19, respectively).

This effect is illustrated in FIGS. 4 and 5, where FIG. 4 plots calculated energy versus wavelength for a blackbody at 1600° C. and FIG. 5 shows an expanded portion of FIG. 4 for the wavelength range of 500 to 2500 nm (see right hand vertical axis and curve 15) along with transmission curves for 0.009 mole percent and 0.012 mole percent iron (as $Fe_2O_3$) in an aluminosilicate glass which was melted under typical conditions for an LCD substrate glass (see left hand vertical axis and curves 17 and 19, respectively). As can be seen in FIG. 5, under these conditions, iron catches the peak of the blackbody energy distribution and the integrated impact (the area from about 1000 nm on up) is a steep function of the iron content of the glass. Moreover, since the peak of the black body energy distribution moves to longer wavelengths as temperature decreases, the impact of iron continues to be large for other glass temperatures. In terms of relative IR absorption, $Fe^{3+}$ has an absorption cross section that is approximately 10 times that of $Fe^{2+}$, which is another reason why it is advantageous for iron to be present in the batch materials as $Fe_2O_3$.

Third, the portion of iron which is in the +2 state (nominally FeO) can absorb oxygen generated at the Pt/glass interface or from newly-formed oxygen-rich bubbles produced as a result of hydrogen permeation through platinum or platinum alloys.

Unfortunately, high levels of iron produce strong coloration of the glass and very high levels cause so much infrared radiation absorption in the melter that it interferes with heat transfer to the bulk glass. The total iron level in the glass is therefore preferably in the range of 0.010 mole percent to 0.033 mole percent, more preferably, in the range of 0.010 mole percent to 0.020 mole percent, and most preferably, in the range of 0.012 mole percent to 0.024 mole percent for more reduced glasses or the range of 0.011 mole percent to 0.016 mole percent for more oxidized glasses.

To summarize, the advantages of using iron as a fining agent include:

(1) Unlike antimony or arsenic, iron poses no health or environmental hazards.

(2) Unlike halides—a possible chemical fining approach supplanting arsenic or antimony—iron does not result in pollution abatement challenges and creation/disposal of the hazardous wastes that result.

(3) Unlike elevated levels of tin oxide, iron does not in any way compromise the liquidus temperature of an LCD substrate, and hence cannot impact the liquidus viscosity of the glass.

(4) Unlike most other transition metal multivalents, low levels of iron only weakly color LCD substrates, and at the levels of the inventive method do not impact transparency in a way that impinges upon the application at hand.

(5) Unlike the tramp levels that might arise from impurities in standard (or low iron) batch materials, the deliberate incorporation of iron at the levels proposed demonstrably suppresses formation of oxygen blisters as a result of hydrogen permeation in glasses, decreases the irradiance of LCD glass and thus improves management of heat balance, and, when added as $Fe_2O_3$, may impart additional fining action in the early stages of melting that—while small—enhances elimination of melt-induced gaseous inclusions.

Iron/tin fining can be used alone or in combination with other fining techniques if desired. For example, iron/tin fining can be combined with halide fining, e.g., bromine fining. However, halide fining presents challenges from a pollution abatement point of view and, as discussed above, halides can complex with iron to produce glass with unacceptable transmission characteristics. Accordingly, it is not preferred. Other possible combinations include, but are not limited to, iron/tin fining plus sulfate, sulfide, cerium oxide, mechanical bubbling, and/or vacuum fining. However, as also discussed above, the sulfur content of the glass needs to be controlled to avoid the production of gaseous defects containing $SO_{2+x}$. In all of these cases, maintaining an $\Sigma[RO]/[Al_2O_3]$ ratio and MgO concentration in the ranges discussed above makes the fining process easier to perform and more effective.

The glasses of the invention can be manufactured using various techniques known in the art. Preferably, the glasses are made using a downdraw process and, most preferably, by a fusion downdraw process. Compared to other forming processes, such as the float process, the fusion process is preferred for several reasons. First, glass substrates made from the fusion process do not require polishing. Current glass substrate polishing is capable of producing glass substrates having an average surface roughness greater than about 0.5 nm (Ra), as measured by atomic force microscopy. Glass substrates produced according to the present invention and using the fusion process have an average surface roughness as measured by atomic force microscopy of less than 0.5 nm. The substrates also have an average internal stress as measured by optical retardation which is less than or equal to 150 psi.

Compositions of the glasses of the invention are determined using quantitative analysis techniques well known in the art. Suitable techniques are X-ray fluorescence spectrometry (XRF) for elements with an atomic number higher than 8, inductively coupled plasma optical emission spectrometry (ICP-OES), inductively coupled plasma mass spectrometry (ICP-MS), and electron microprobe analysis. See, for example, J. Nolte, *ICP Emission Spectrometry: A Practical Guide*, Wiley-VCH (2003), H. E. Taylor, *Inductively Coupled Plasma Mass Spectroscopy: Practices and Techniques*, Academic Press (2000), and S. J. B. Reed, *Electron Microprobe Analysis*, Cambridge University Press; 2nd edition (1997). For an analysis time of about 10 minutes for each element, detection limits of approximately 200 ppm for F and approximately 20 ppm for Cl, Br, Fe, and Sn can be readily achieved using electron microprobe analysis. For sulfur, analysis equipment employing combustion infrared spectrometry manufactured by LECO Corporation (St. Joseph, Minn.) can be used with a typical detection limit of 4 ppm or approximately 0.0008 mole percent for the glasses of the invention. For trace elements, ICP-MS is preferred.

C. Examples

The invention is further illustrated by the following examples, which are meant to be illustrative, and not in any way limiting, to the claimed invention.

Examples 1-57

Table 1 lists examples of the glasses of the invention and comparative glasses in terms of mole percents which are either calculated on an oxide basis from the glass batches in the case of the crucible melts or determined from measurements on the finished glass for the compositions prepared using the continuous melter (see below). Table 1 also lists various physical properties for these glasses, the units for these properties being as follows:

| | |
|---|---|
| Density | grams/centimeter$^3$ |
| CTE | ×10$^{-7}$/° C.(0-300° C.) |
| Strain Point | ° C. |
| Young's Modulus | ×10$^{+6}$ psi |
| Melting Temp. | ° C. |
| Liquidus Temp. | ° C. |
| Liquidus Viscosity | poises |

Inasmuch as the sum of the individual constituents totals or very closely approximates 100, for all practical purposes the reported values may be deemed to represent mole percent. The actual batch ingredients may comprise any materials, either oxides, or other compounds, which, when melted together with the other batch components, will be converted into the desired oxide in the proper proportions. For example, $SrCO_3$ and $CaCO_3$ can provide the source of SrO and CaO, respectively.

The specific batch ingredients used to prepare the glasses of Table 1 were fine sand, alumina, boric acid, magnesium oxide, limestone, strontium carbonate or strontium nitrate, and tin oxide.

The glasses of Examples 1-6, 9-11, 29-31, 33-34, 36-42, and 46-56 were prepared by melting 3,000 gram batches of each glass composition at a temperature and time to result in a relatively homogeneous glass composition, e.g., at a temperature of about 1600° C. for a period of about 16 hours in platinum crucibles. In particular, the batch materials were ball-milled for one hour using ceramic media in a ceramic mill The batch was transferred to an 1800 cc platinum crucible and loaded into a furnace at 1600° C. After 16 hours, the crucible was removed from the furnace and the glass was poured onto a cold steel plate. When viscous enough to handle, the glass was transferred to an annealing oven at 725° C., held for one hour at this temperature, then cooled at 0.5° C./minute to room temperature.

In Examples 7-8, 12-28, 32, 35, and 43-45, the melting was done in a laboratory scale, continuous, Joule-heated melter. Batches of the raw materials massing 45.4 kg were weighed into a mechanical mixer and combined together for five minutes. An amount of water corresponding to about 0.25 kg was added to the mixture during the last 60 seconds of mixing to reduce dust generation. The mixture was loaded using a screw feeder into a ceramic-lined furnace with tin oxide electrodes and opposing burners firing over the melt surface. The power supplied by the electrodes was controlled by keeping the glass at a near-constant resistivity, corresponding to temperatures between 1590° C. and 1610° C. The glass moved from the molter into a platinum-based conditioning system consisting of a high-temperature finer followed by a stir chamber. The finer and stir chamber temperatures were kept constant throughout the experiment, whereas the melt temperature of the ceramic-lined melter was allowed to vary with composition. The glass drained out of the stir chamber through a heated orifice and was rolled into a ribbon approximately 5 mm thick and 30 mm wide. The glass from the ribbon was analyzed periodically for defects, which were identified, counted, and converted to defects per pound. Compositions were obtained from the ribbon via standard chemical methods (see the analysis methods described above), and physical properties were obtained as described below.

Example 57 was prepared using a full-scale fusion process which employed a capsule of the type disclosed in US Patent Publication No. No. 2006/0242996.

The glass properties set forth in Table 1 were determined in accordance with techniques conventional in the glass art. Thus, the linear coefficient of thermal expansion (CTE) over the temperature range 0-300° C. is expressed in terms of x 10$^{-7}$/° C. and the strain point is expressed in terms of ° C. These were determined from fiber elongation techniques (ASTM references E228-85 and C336, respectively). The density in terms of grams/cm$^3$ was measured via the Archimedes method (ASTM C693). The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81). The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. The liquidus viscosity in poises was determined from the liquidus temperature and the coefficients of the Fulcher equation. Young's modulus values in terms of Mpsi were determined using a resonant ultrasonic spectroscopy technique of the general type set forth in ASTM E1875-00e1.

Examples 1-43 and 53-57 have densities, CTE's, strain points, and Young's modulus values that make the glasses suitable for use in display applications, such as AMLCD applications. The glasses also have chemical durabilities suitable for these applications. In particular, Examples 12, 13, 23, 28, and 57 were each found to have 110BHF values of between L25 and 1.35 milligrams/cm$^2$ and HCl durabilities of between 0.5 and 0.8 milligrams/cm$^2$. The glasses of Examples 1-43 and 53-57 can also be formed using downdraw techniques, such as the fusion technique. Thus, they have liquidus temperatures less than or equal to 1170° C. and liquidus viscosities equal to or greater than 100,000, and in most cases, equal to or greater than 150,000. The iron content of the glasses of Table 1 is in the range of 0.010 to 0.013 mole percent.

A glass having the composition and properties shown in Example 57 is currently regarded as representing the most preferred embodiment of the invention, that is, as providing the best combination of properties for the purposes of the invention at this time.

Examples 44 and 45 illustrate glasses which have liquidus viscosities less than 100,000 poises. Example 44 was found to produce mullite upon crystallization, which is an undesirable liquidus phase for downdraw processes. The presence of this phase can be eliminated by a small increase in the $\Sigma[RO]/[Al_2O_3]$ ratio. More generally, in the compositional space of the present invention, localized regions exist where the liquidus phase is mullite. These regions can be easily recognized by persons skilled in the art from the present disclosure and avoided by small changes in the $\Sigma[RO]/[Al_2O_3]$ ratio.

Example 45 has a MgO concentration close to the upper limit of 3.0 mole percent. As noted above, as MgO increases, the liquidus temperatures initially go down but then increase. Example 45 illustrates this later effect.

Examples 46-48 have $\Sigma[RO]/[Al_2O_3]$ ratios of less than 1.00 and thus have either a low liquidus viscosity (Example 46) or high melting temperatures (Examples 47 and 48). Examples 48-52 have MgO concentrations less than 1.0 mole percent and thus have high or marginal melting temperatures (Examples 48-50) or high CTE's (Examples 51 and 52).

Example 58

Figure 6:
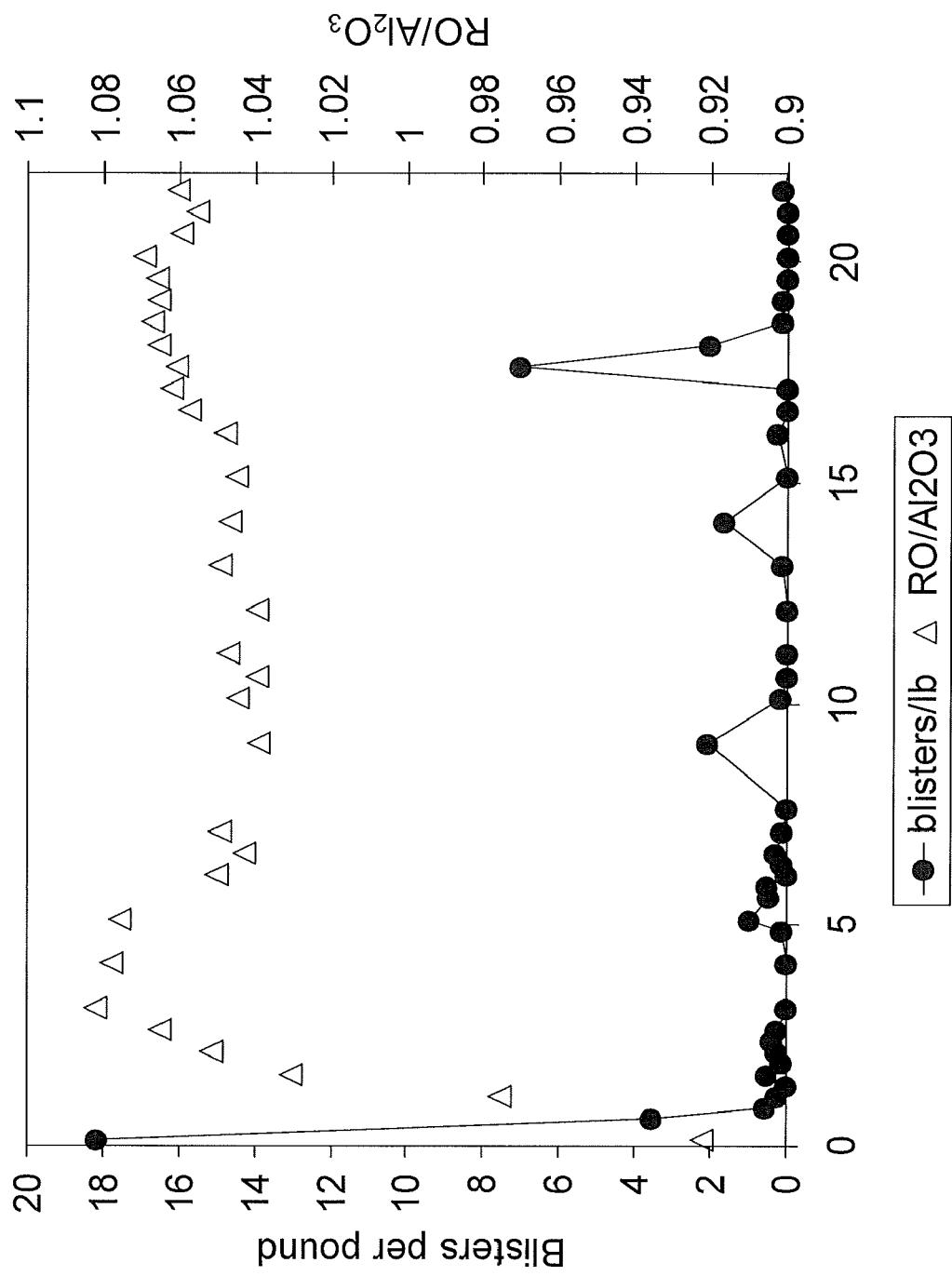
FIG. 6 shows the effect of the $\Sigma[RO]/[Al_2O_3]$ ratio on inclusions (blisters) per pound values for a multi-day experiment.

FIG. 6 illustrates the dramatic improvement in defect levels that can be achieved by switching the $\Sigma[RO]/[Al_2O_3]$ ratio of a glass from below 1.00 to above 1.00. This graph shows the results of an experimental study done over a 30 day period in which the $\Sigma[RO]/[Al_2O_3]$ ratio was adjusted by increasing CaO and/or MgO at the expense of $Al_2O_3$ and/or $SiO_2$. The triangular data points show the $[RO]/[Al_2O_3]$ ratios on the various days of the experiment, and the solid circles show the number of inclusions per pound. As can be seen, as soon as the $\Sigma[RO]/[Al_2O_3]$ ratio broke through the 1.00 level, the inclusion level dropped by essentially two orders of magnitude and remained at low levels even with changes in CaO and/or MgO. Throughout the experiment, the MgO concentration was greater than 1.0 mole percent and the $SiO_2$ concentration was less than 71 mole percent.

Example 59

Figure 7:
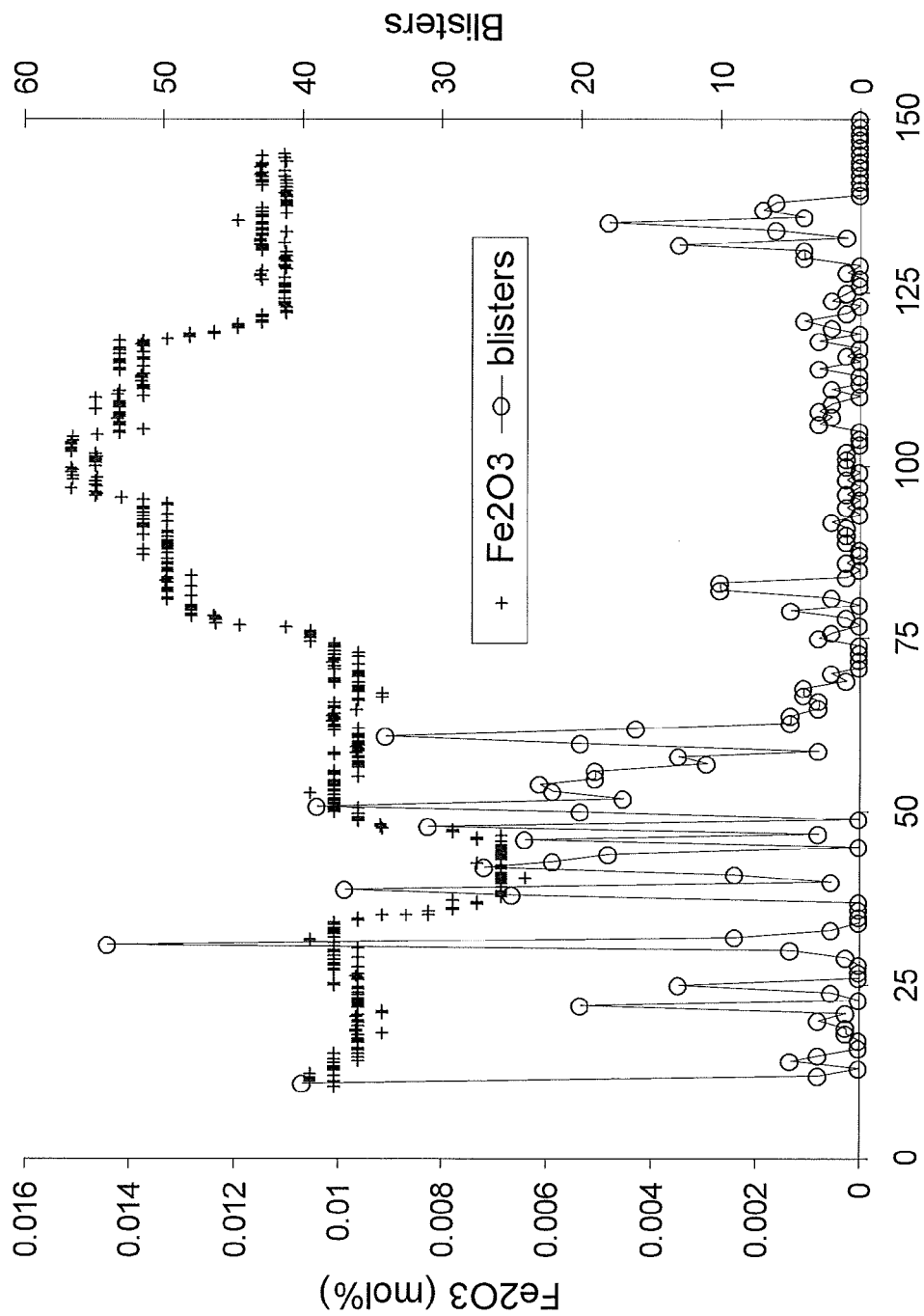
FIG. 7 shows the effect of iron content on defects (blisters) per pound values for a multi-day experiment.

FIG. 7 illustrates the dramatic improvement in defect levels that can be achieved by increasing the iron content of a glass from below 0.010 mole percent to above 0.010 mole percent. This graph shows the results of an experimental study done over a multi-day period in which the iron content of the glass was adjusted through the selection of batch materials having varying amounts of iron. The "+" data points show the iron content on the various days of the experiment, and the "o" data points show the number of defects (gaseous inclusions) per pound. As can be seen, as soon as the iron content broke through the 0.010 mole percent level, the inclusion level dropped substantially and consistently remained at low levels.

Example 60

FIG. 8 illustrates the substantially monotonic improvement in defect levels that can be achieved by increasing the iron content of a glass. This graphs plots (i) the average number of blisters found during routine inspection of glass sheets having the composition of Example 57 of Table 1 produced by a fusion process against (ii) the total iron content of the glass as determined by x-ray fluorescence spectroscopy. As can be seen, increasing the Fe content resulted in a dramatic decrease in blisters. No other process or composition variables were so closely tied to this outcome.

Based on this result, the most desirable Fe level is about 0.013 mole percent or more, which corresponds to approximately 330 ppm or more for the glass used in this experiment. The different iron levels were obtained by using different batch materials with different levels of iron contamination. Since the initial valence state of iron varies wildly from one extreme (e.g., limestone, mostly $Fe^{2+}$) to the other (e.g., sand, mostly $Fe^{3+}$), the initial valence state is not important to this result.

Example 61

Glass sheets having $SiO_2$, $Al_2O_3$, $B_2O_3$, MgO, CaO, SrO, and $SnO_2$ contents in accordance with Example 57 of Table 1 were produced using a downdraw process, specifically, a full-scale fusion process which employed a capsule of the type disclosed in US Patent Publication No. No. 2006/0242996. The sheets were substantially free of alkalis, arsenic, and antimony. The iron, tin, halide and sulfur contents of the glass were determined by the techniques described above. The halide and sulfur contents were in the preferred ranges specified in Section III above. The iron and tin contents of the glass were adjusted through the selection of batch materials to reduce gaseous inclusions. At iron contents of 0.010 mole percent or more and tin contents of 0.017 mole percent or more, the process produces populations of 50 sequential glass sheets which have an average inclusion level of less than 0.05 gaseous inclusions/cubic centimeter, each sheet in the population having a volume of at least 500 cubic centimeters. In particular, such inclusion levels were found for an iron content of 0.013 mole percent and a tin content of 0.07 mole percent.

Although the invention has been described in detail for the purpose of illustration, it is understood that such detail is solely for that purpose and variations can be made therein by those skilled in the art without departing from the spirit and scope of the invention which is defined by the following claims.

TABLE 1

|  | 1 | 2 | 3 | 4 | 5 | 6 |
|---|---|---|---|---|---|---|
| Composition (mol %) |  |  |  |  |  |  |
| $SiO_2$ | 68.80 | 68.64 | 68.95 | 68.95 | 68.98 | 68.98 |
| $Al_2O_3$ | 10.55 | 10.60 | 10.49 | 10.49 | 10.45 | 10.45 |
| $B_2O_3$ | 9.94 | 9.99 | 9.90 | 9.90 | 9.90 | 9.90 |

TABLE 1-continued

|  | | | | | | |
|---|---|---|---|---|---|---|
| MgO | 2.01 | 2.02 | 1.00 | 2.00 | 1.00 | 2.00 |
| CaO | 8.13 | 8.18 | 9.09 | 8.09 | 9.10 | 8.10 |
| SrO | 0.50 | 0.50 | 0.50 | 0.50 | 0.50 | 0.50 |
| $SnO_2$ | 0.07 | 0.07 | 0.07 | 0.07 | 0.07 | 0.07 |
| $\Sigma[RO]/[Al_2O_3]$ | 1.01 | 1.01 | 1.01 | 1.01 | 1.01 | 1.01 |
| Properties | | | | | | |
| Density | 2.378 | 2.378 | 2.385 | 2.381 | — | — |
| CTE | 31.3 | 31.5 | 32.0 | 30.5 | — | — |
| Strain Point | 677 | 670 | 691 | 688 | — | — |
| Young's Modulus | 10.6 | 10.6 | — | — | — | — |
| Melting Temp. | 1629 | 1641 | 1649 | 1645 | 1640 | — |
| Liquidus Temp. | 1165 | 1150 | 1165 | 1140 | 1145 | 1150 |
| Liquidus Viscosity | 158000 | 235000 | 214000 | 370000 | 262000 | — |

|  | 7 | 8 | 9 | 10 | 11 | 12 |
|---|---|---|---|---|---|---|
| Composition (mol %) | | | | | | |
| $SiO_2$ | 69.41 | 68.91 | 68.44 | 68.59 | 68.75 | 69.25 |
| $Al_2O_3$ | 10.19 | 10.40 | 10.60 | 10.55 | 10.49 | 10.21 |
| $B_2O_3$ | 9.96 | 9.94 | 9.99 | 9.94 | 9.90 | 9.96 |
| MgO | 1.87 | 1.98 | 1.21 | 1.21 | 1.20 | 2.04 |
| CaO | 7.98 | 7.45 | 9.19 | 9.14 | 9.09 | 7.96 |
| SrO | 0.52 | 1.25 | 0.50 | 0.50 | 0.50 | 0.51 |
| $SnO_2$ | 0.07 | 0.07 | 0.07 | 0.07 | 0.07 | 0.07 |
| $\Sigma[RO]/[Al_2O_3]$ | 1.02 | 1.03 | 1.03 | 1.03 | 1.03 | 1.03 |
| Properties | | | | | | |
| Density | 2.365 | 2.390 | 2.384 | 2.383 | 2.386 | 2.366 |
| CTE | 30.7 | 31.8 | 32.9 | 32.0 | 31.1 | 31.4 |
| Strain Point | 664 | 665 | 680 | 674 | 689 | 664 |
| Young's Modulus | — | — | 10.5 | 10.6 | — | — |
| Melting Temp. | 1641 | 1631 | 1628 | 1632 | 1646 | 1640 |
| Liquidus Temp. | 1145 | 1120 | 1135 | 1140 | 1150 | 1150 |
| Liquidus Viscosity | 263000 | 371000 | 294000 | 279000 | 273000 | 225000 |

|  | 13 | 14 | 15 | 16 | 17 | 18 |
|---|---|---|---|---|---|---|
| Composition (mol %) | | | | | | |
| $SiO_2$ | 68.84 | 68.18 | 69.16 | 67.59 | 67.65 | 69.32 |
| $Al_2O_3$ | 10.42 | 10.69 | 10.28 | 11.06 | 11.06 | 10.17 |
| $B_2O_3$ | 9.94 | 10.04 | 9.88 | 9.84 | 9.74 | 9.86 |
| MgO | 1.98 | 1.49 | 1.80 | 2.25 | 2.26 | 2.33 |
| CaO | 7.42 | 8.84 | 8.30 | 8.65 | 8.67 | 7.74 |
| SrO | 1.33 | 0.69 | 0.51 | 0.54 | 0.55 | 0.51 |
| $SnO_2$ | 0.07 | 0.07 | 0.07 | 0.07 | 0.07 | 0.07 |
| $\Sigma[RO]/[Al_2O_3]$ | 1.03 | 1.03 | 1.03 | 1.03 | 1.04 | 1.04 |
| Properties | | | | | | |
| Density | 2.391 | 2.379 | 2.368 | 2.384 | 2.385 | 2.365 |
| CTE | 32.3 | 32.5 | 31.1 | 31.5 | 31.6 | 30.4 |
| Strain Point | 664 | 663 | 665 | 665 | 665 | 666 |
| Young's Modulus | — | — | — | — | — | — |
| Melting Temp. | 1622 | 1621 | 1632 | 1612 | 1606 | 1635 |
| Liquidus Temp. | 1105 | 1125 | 1125 | 1140 | 1135 | 1150 |
| Liquidus Viscosity | 530000 | 305000 | 376000 | 195000 | 224000 | 217000 |

|  | 19 | 20 | 21 | 22 | 23 | 24 |
|---|---|---|---|---|---|---|
| Composition (mol %) | | | | | | |
| $SiO_2$ | 69.06 | 68.64 | 68.01 | 68.46 | 69.28 | 69.08 |
| $Al_2O_3$ | 10.23 | 10.46 | 10.66 | 10.49 | 10.18 | 10.23 |
| $B_2O_3$ | 9.97 | 9.90 | 10.11 | 9.99 | 9.79 | 9.88 |
| MgO | 1.87 | 1.82 | 1.84 | 1.84 | 1.85 | 1.88 |
| CaO | 8.31 | 8.62 | 8.71 | 8.66 | 8.34 | 8.37 |
| SrO | 0.49 | 0.49 | 0.60 | 0.49 | 0.49 | 0.49 |
| $SnO_2$ | 0.07 | 0.07 | 0.07 | 0.07 | 0.07 | 0.07 |
| $\Sigma[RO]/[Al_2O_3]$ | 1.04 | 1.04 | 1.05 | 1.05 | 1.05 | 1.05 |
| Properties | | | | | | |
| Density | 2.369 | 2.374 | 2.378 | 2.375 | 2.369 | 2.371 |
| CTE | 31.2 | 31.5 | 32.3 | 31.5 | 31.1 | 31.2 |
| Strain Point | 665 | 664 | 667 | 666 | 666 | 665 |
| Young's Modulus | — | — | — | — | — | — |

TABLE 1-continued

| | | | | | | |
|---|---|---|---|---|---|---|
| Melting Temp. | 1637 | 1624 | 1616 | 1619 | 1644 | 1621 |
| Liquidus Temp. | 1130 | 1115 | 1130 | 1120 | 1145 | 1135 |
| Liquidus Viscosity | 360000 | 408000 | 275000 | 363000 | 233000 | 243000 |

| | 25 | 26 | 27 | 28 | 29 | 30 |
|---|---|---|---|---|---|---|
| Composition (mol %) | | | | | | |
| $SiO_2$ | 68.88 | 69.11 | 68.52 | 67.80 | 68.29 | 68.45 |
| $Al_2O_3$ | 10.37 | 10.17 | 10.43 | 10.83 | 10.55 | 10.49 |
| $B_2O_3$ | 9.79 | 9.96 | 10.01 | 9.90 | 9.95 | 9.90 |
| MgO | 1.96 | 2.22 | 1.21 | 2.18 | 2.51 | 2.50 |
| CaO | 8.45 | 7.96 | 9.25 | 8.74 | 8.13 | 8.09 |
| SrO | 0.48 | 0.51 | 0.51 | 0.48 | 0.50 | 0.50 |
| $SnO_2$ | 0.07 | 0.07 | 0.07 | 0.07 | 0.07 | 0.07 |
| $\Sigma[RO]/[Al_2O_3]$ | 1.05 | 1.05 | 1.05 | 1.05 | 1.06 | 1.06 |
| Properties | | | | | | |
| Density | 2.375 | 2.367 | 2.371 | 2.384 | 2.380 | 2.379 |
| CTE | 31.8 | 31.1 | 32.2 | 32.1 | 31.8 | 30.8 |
| Strain Point | 668 | 664 | 665 | 667 | 671 | 669 |
| Young's Modulus | — | — | — | — | 10.7 | 10.6 |
| Melting Temp. | 1630 | 1634 | 1627 | 1612 | 1633 | 1632 |
| Liquidus Temp. | 1120 | 1115 | 1115 | 1120 | 1150 | 1165 |
| Liquidus Viscosity | 408000 | 481000 | 448000 | 330000 | 219000 | 148000 |

| | 31 | 32 | 33 | 34 | 35 | 36 |
|---|---|---|---|---|---|---|
| Composition (mol %) | | | | | | |
| $SiO_2$ | 69.75 | 67.45 | 68.09 | 68.25 | 68.51 | 68.11 |
| $Al_2O_3$ | 10.70 | 10.88 | 10.55 | 10.49 | 10.30 | 10.44 |
| $B_2O_3$ | 8.16 | 10.02 | 9.94 | 9.90 | 10.03 | 9.85 |
| MgO | 1.28 | 2.04 | 1.71 | 1.70 | 1.65 | 2.98 |
| CaO | 9.58 | 9.00 | 9.14 | 9.09 | 8.93 | 8.05 |
| SrO | 0.46 | 0.54 | 0.50 | 0.50 | 0.51 | 0.50 |
| $SnO_2$ | 0.07 | 0.07 | 0.07 | 0.07 | 0.07 | 0.07 |
| $\Sigma[RO]/[Al_2O_3]$ | 1.06 | 1.06 | 1.08 | 1.08 | 1.08 | 1.10 |
| Properties | | | | | | |
| Density | 2.405 | 2.384 | 2.388 | 2.386 | 2.373 | 2.382 |
| CTE | 32.9 | 32.7 | 31.4 | 32.6 | 32.6 | 31.0 |
| Strain Point | 684 | 661 | 673 | 674 | 664 | 668 |
| Young's Modulus | — | — | 10.6 | 10.6 | — | 10.7 |
| Melting Temp. | — | 1610 | 1619 | 1622 | 1640 | 1626 |
| Liquidus Temp. | 1155 | 1135 | 1155 | 1150 | 1130 | 1170 |
| Liquidus Viscosity | — | 200000 | 156000 | 177000 | 311000 | 122000 |

| | 37 | 38 | 39 | 40 | 41 | 42 |
|---|---|---|---|---|---|---|
| Composition (mol %) | | | | | | |
| $SiO_2$ | 67.95 | 68.73 | 68.73 | 68.65 | 67.75 | 67.91 |
| $Al_2O_3$ | 10.49 | 10.10 | 10.10 | 10.09 | 10.49 | 10.44 |
| $B_2O_3$ | 9.90 | 9.90 | 9.90 | 9.90 | 9.90 | 9.84 |
| MgO | 3.00 | 1.00 | 2.00 | 1.10 | 2.20 | 2.19 |
| CaO | 8.09 | 9.70 | 8.70 | 9.69 | 9.09 | 9.05 |
| SrO | 0.50 | 0.50 | 0.50 | 0.50 | 0.50 | 0.50 |
| $SnO_2$ | 0.07 | 0.07 | 0.07 | 0.07 | 0.07 | 0.07 |
| $\Sigma[RO]/[Al_2O_3]$ | 1.10 | 1.11 | 1.11 | 1.12 | 1.12 | 1.12 |
| Properties | | | | | | |
| Density | 2.385 | — | — | 2.390 | 2.390 | 2.393 |
| CTE | 30.7 | — | — | 33.3 | 33.3 | 33.1 |
| Strain Point | 671 | — | — | 685 | 670 | 668 |
| Young's Modulus | 10.7 | — | — | — | 10.7 | 10.7 |
| Melting Temp. | 1616 | 1637 | 1631 | 1644 | 1611 | 1615 |
| Liquidus Temp. | 1155 | 1150 | 1150 | 1145 | 1145 | 1140 |
| Liquidus Viscosity | 155000 | 201000 | 177000 | 269000 | 173000 | 204000 |

| | 43 | 44 | 45 | 46 | 47 | 48 |
|---|---|---|---|---|---|---|
| Composition (mol %) | | | | | | |
| $SiO_2$ | 68.53 | 68.79 | 68.09 | 69.25 | 69.25 | 69.25 |
| $Al_2O_3$ | 10.04 | 10.41 | 10.86 | 10.79 | 10.79 | 10.79 |

TABLE 1-continued

|  | | | | | | |
|---|---|---|---|---|---|---|
| B$_2$O$_3$ | 10.04 | 9.92 | 9.80 | 9.90 | 9.90 | 9.90 |
| MgO | 1.94 | 1.97 | 2.88 | 2.00 | 1.00 | 0.00 |
| CaO | 8.90 | 7.81 | 7.77 | 7.49 | 8.49 | 9.49 |
| SrO | 0.48 | 1.03 | 0.53 | 0.50 | 0.50 | 0.50 |
| SnO$_2$ | 0.07 | 0.07 | 0.07 | 0.07 | 0.07 | 0.07 |
| Σ[RO]/[Al$_2$O$_3$] | 1.13 | 1.04 | 1.03 | 0.93 | 0.93 | 0.93 |
| Properties | | | | | | |
| Density | 2.373 | 2.385 | 2.380 | — | 2.364 | 2.385 |
| CTE | 32.6 | 31.9 | 30.4 | — | 29.6 | 31.3 |
| Strain Point | 661 | 666 | 669 | — | — | — |
| Young's Modulus | — | — | — | — | — | — |
| Melting Temp. | 1620 | 1622 | 1615 | 1645 | 1688 | 1671 |
| Liquidus Temp. | 1115 | 1210 | 1200 | 1220 | 1200 | 1160 |
| Liquidus Viscosity | 362000 | 52000 | 59000 | 58000 | 137000 | 294000 |

|  | 49 | 50 | 51 | 52 | 53 | 54 |
|---|---|---|---|---|---|---|
| Composition (mol %) | | | | | | |
| SiO$_2$ | 68.98 | 68.73 | 68.45 | 68.45 | 67.62 | 67.76 |
| Al$_2$O$_3$ | 10.45 | 10.10 | 10.19 | 10.09 | 11.13 | 11.29 |
| B$_2$O$_3$ | 9.90 | 9.90 | 9.90 | 9.90 | 9.00 | 8.00 |
| MgO | 0.00 | 0.00 | 0.30 | 0.30 | 2.74 | 3.25 |
| CaO | 10.10 | 10.70 | 10.59 | 10.69 | 8.18 | 7.63 |
| SrO | 0.50 | 0.50 | 0.50 | 0.50 | 0.75 | 0.98 |
| BaO | | | | | 0.51 | 1.02 |
| SnO$_2$ | 0.07 | 0.07 | 0.07 | 0.07 | 0.07 | 0.07 |
| Σ[RO]/[Al$_2$O$_3$] | 1.01 | 1.11 | 1.12 | 1.14 | 1.09 | 1.14 |
| Properties | | | | | | |
| Density | 2.394 | 2.375 | 2.397 | 2.395 | — | — |
| CTE | 33.4 | 33.4 | 35.6 | 34.7 | — | — |
| Strain Point | — | — | 686 | 685 | — | — |
| Young's Modulus | — | — | — | — | — | — |
| Melting Temp. | 1674 | 1650 | 1637 | 1638 | — | — |
| Liquidus Temp. | 1160 | 1160 | 1170 | 1160 | — | — |
| Liquidus Viscosity | 246000 | 173000 | 143000 | 172000 | — | — |

|  | 55 | 56 | 57 |
|---|---|---|---|
| Composition (mol %) | | | |
| SiO$_2$ | 67.51 | 67.10 | 67.56 |
| Al$_2$O$_3$ | 11.02 | 10.40 | 11.00 |
| B$_2$O$_3$ | 9.88 | 9.92 | 9.83 |
| MgO | 1.41 | 1.75 | 2.26 |
| CaO | 8.05 | 8.03 | 8.73 |
| SrO | 0.51 | 0.51 | 0.52 |
| BaO | 1.52 | 2.19 | 0.00 |
| SnO$_2$ | 0.07 | 0.07 | 0.07 |
| Σ[RO]/[Al$_2$O$_3$] | 1.04 | 1.20 | 1.05 |
| Properties | | | |
| Density | — | — | 2.383 |
| CTE | — | — | 32.3 |
| Strain Point | — | — | 667 |
| Young's Modulus | — | — | — |
| Melting Temp. | — | — | — |
| Liquidus Temp. | 1080 | 1080 | 1120 |
| Liquidus Viscosity | 720000 | 540000 | 330000 |

What is claimed is:

1. A glass that is substantially free of alkali metal oxides, barium, arsenic, and antimony and comprises:
   (a) SiO$_2$, Al$_2$O$_3$, B$_2$O$_3$ MgO, CaO and SrO;
   (b) iron expressed as Fe$_2$O$_3$ in the range of 0.010-0.033 mole percent; and
   (c) tin expressed as SnO$_2$ in the range of 0.017-0.112 mole percent.

2. The glass of claim 1 wherein the glass satisfies the following relationship:

Σ[RO]/[Al$_2$O$_3$]≧1.00, where [Al$_2$O$_3$] is the mole percent of Al$_2$O$_3$ and Σ[RO] equals the sum of the mole percents of MgO, CaO, SrO, and BaO.

3. The glass of claim 2 wherein the glass also satisfies the relationship:

Σ[RO]/[Al$_2$O$_3$]≦1.25.

4. The glass of claim 1 wherein the glass has one or both of the following properties:
   (a) a sulfur content expressed as elemental sulfur that is less than or equal to 0.002 mole percent; and/or
   (b) a halide content that is less than or equal to 0.4 mole percent.

5. The glass of claim 4 wherein the glass has both properties (a) and (b).

6. The glass of claim 1 wherein the glass has one or more of the following properties:
   (a) a density that is less than or equal to 2.41 grams/cm$^3$;
   (b) a liquidus viscosity that is greater than or equal to 100,000 poise;
   (c) a strain point that is greater than or equal to 650° C.; and/or
   (d) a linear coefficient of thermal expansion (CTE) over the temperature range 0-300° C. which satisfies the relationship:
   $$28 \times 10^{-7}/°C. \leq CTE \leq 35 \times 10^{-7}/°C.$$

7. The glass of claim 6 wherein the glass has all of properties (a), (b), (c), and (d).

8. The glass of claim 1 wherein the glass has an Fe$^{2+}$ to Fe$^{3+}$ ratio that is equal to or greater than 0.5.

* * * * *

UNITED STATES PATENT AND TRADEMARK OFFICE
CERTIFICATE OF CORRECTION

PATENT NO. : 7,935,649 B2  
APPLICATION NO. : 12/756542  
DATED : May 3, 2011  
INVENTOR(S) : Adam James Ellison et al.

It is certified that error appears in the above-identified patent and that said Letters Patent is hereby corrected as shown below:

| No. | Col. | Line | Description |
|---|---|---|---|
| 1 | 9 | 7 | Please delete "foaming" and add --forming-- |
| 2 | 10 | 19 | Please delete "AP$^+$" and add --Al$^{3+}$-- |
| 3 | 19 | 14 | Please delete "Minn." and add --Mich.-- |
| 4 | 20 | 15 | Please delete "molter" and add --melter-- |
| 5 | 20 | 63 | Please delete "L25" and add --1.25-- |

Signed and Sealed this  
Nineteenth Day of July, 2011

David J. Kappos  
*Director of the United States Patent and Trademark Office*